(12) United States Patent
Takezawa et al.

(10) Patent No.: US 6,879,323 B1
(45) Date of Patent: Apr. 12, 2005

(54) THREE-DIMENSIONAL MODEL GENERATION DEVICE, THREE-DIMENSIONAL MODEL GENERATION METHOD, AND RECORDING MEDIUM FOR STORING THE THREE-DIMENSIONAL MODEL GENERATION METHOD

(75) Inventors: Hajime Takezawa, Nara (JP); Yoshinori Nagai, Nara (JP); Kazuhiro Saiki, Nara (JP); Toshiya Takahashi, Kyoto (JP); Kyouichi Suzuki, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 244 days.

(21) Appl. No.: 09/679,482

(22) Filed: Oct. 4, 2000

(30) Foreign Application Priority Data

Oct. 4, 1999 (JP) .......................................... 11-283387

(51) Int. Cl.[7] .............................................. G06T 17/00
(52) U.S. Cl. ........................ 345/420; 345/582; 345/630; 382/118; 382/285; 340/5.83; 348/14.1; 902/3; 902/6
(58) Field of Search ................................ 345/419–420, 345/630, 634, 581–582; 382/118, 285; 348/14.13, 14.3; 340/5.83; 902/3, 6

(56) References Cited

U.S. PATENT DOCUMENTS 5,933,527 A * 8/1999 Ishikawa .................... 382/190
6,016,148 A * 1/2000 Kang et al. ................. 345/622
6,046,744 A * 4/2000 Hoppe ........................ 345/419
6,256,039 B1 * 7/2001 Krishnamurthy ............ 345/420
6,381,346 B1 * 4/2002 Eraslan ....................... 382/118
6,456,287 B1 * 9/2002 Kamen et al. .............. 345/427

OTHER PUBLICATIONS

Yokoyama, T. et al. "Facial Contour Extraction Model," Apr. 14–16, 1998, Automatic Face and Gesture Recognition, 1998. Proceedings of 3rd IEEE Internal Conference. pp. 254–259.*

* cited by examiner

*Primary Examiner*—Matthew C. Bella
*Assistant Examiner*—Antonio Caschera
(74) *Attorney, Agent, or Firm*—David G. Conlin; William J. Daley, Jr.; Edwards & Angell, LLP

(57) ABSTRACT

Featured is a device for generating a 3-D model of a target object detects size, position, and direction of the target object in an input image. The device calculates the position of each vertex of a 3-D rough geometric model projected onto a 2-D plane in the detected size, position, and direction, as well as onto a 2-D plane in a predetermined size, position, and direction. The device also modifies the input image based on a correspondence relationship between the position of each vertex of the 3-D rough geometric model calculated by the first calculation means and the position of each vertex of the 3-D rough geometric model calculated by the second calculation means to generate a texture images and maps the texture image to the 3-D rough geometric model.

14 Claims, 18 Drawing Sheets

301

302

303

304

FIG.17
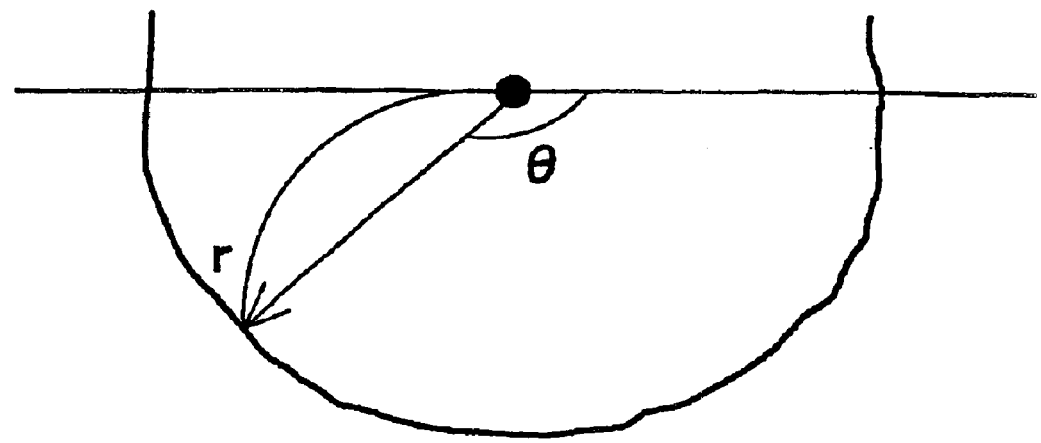
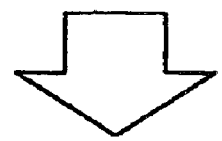
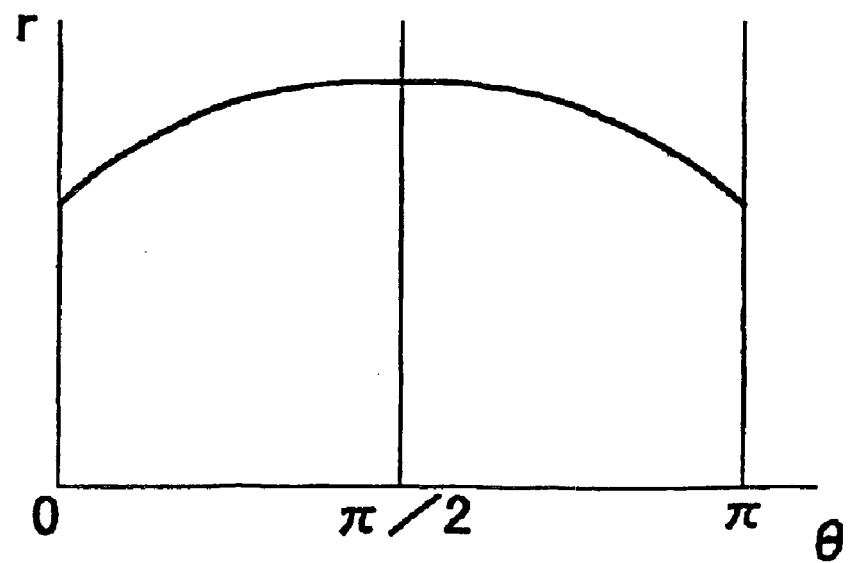

THREE-DIMENSIONAL MODEL GENERATION DEVICE, THREE-DIMENSIONAL MODEL GENERATION METHOD, AND RECORDING MEDIUM FOR STORING THE THREE-DIMENSIONAL MODEL GENERATION METHOD

BACKGROUND OF THE INVENTION

1. Field of the Invention

The present invention relates to a device and a method for generating a three-dimensional model and a recording medium storing the three-dimensional model generation method.

2. Description of the Related Art

Conventionally, various techniques for generating a realistic three-dimensional (hereinafter referred to as "3-D") model as an image have been proposed.

For example, Publication 1 (Masahide KANEKO et al., "Encoding of Face Moving Picture Based on Detection of Change in Geometry and Geometric 3-D Model", IE87-101) describes the following technique. A rough geometric 3-D model, which has been previously created using general knowledge of the geometry of a face, is projected onto an image of a target face. Texture to be mapped to the 3-D model is generated based on the correspondence between the coordinates of the projected 3-D model and the target face image. Thus, the texture-mapped 3-D model is obtained. The texture-mapped 3-D model may be optionally modified to generate facial expressions. Also, the texture-mapped 3-D model may be projected in a direction different from that for the previous projection by which the input image is obtained, so that a pseudo-image when viewed from the different direction can be displayed.

There is an alternative way to generate a more realistic 3-D model. A rough geometric 3-D model, which has been previously created using knowledge of the geometry of a target object, is projected onto an image of the target object. The coordinates of vertexes or feature points of the projected rough geometric 3-D model are fine adjusted in association with deformation or the like so as to match the coordinates of the corresponding vertexes or feature points of the target object image.

For example, Japanese Laid-Open Publication No. 4-289976 discloses the following technique. Two dimensional (hereinafter referred to as "2-D") graphic information on a target 3-D object and a basic geometric 3-D model approximate to the basic geometry of the target object are input. The operator correlates a feature point of the 2-D graphic information with a control point of the basic geometric 3-D model, thereby deforming the basic geometric 3-D model to obtain the desired geometric 3-D model.

Further, simple geometric 3-D models or 3-D models obtained by any technique may be handled as components and may be combined to generate a complex 3-D model. The resulting 3-D models may be handled as components and may be further combined in to a more complex 3-D model.

In general, when a picture is taken of an object, the shooting direction is designated as, for example, "from the front" or "from this direction". Unfortunately, the actual shooting direction is usually shifted from the exact designated direction. For example, when a picture is taken of a human face, the object unintentionally orients slightly upward or downward due to his/her habit even if the object intends to face to "the front". Some systems require that an image taken from the front be used as texture data which is to be mapped to a 3-D model. In this case, the object must be forced to face "the front" exactly by some method. This makes it impossible to easily take a picture. A picture of a face which has been already taken by non-specialized people cannot be used.

Even if such problems are solved, there are still other problems. The outline of a rough geometric model may not match the outline of an actual image of a target object. In this case, the color of the background or the like creeps into the vicinity of the outline of the generated 3-D model, rendering the color of the model unnatural.

In the above-described conventional techniques, a plurality of different geometric models are required. Texture needs to be prepared for each geometric model, is resulting in a great load.

In the conventional techniques where two or more components are combined to generate a 3-D model, the combination method poses problems. Specifically, what is combined therein is position, size, or the like. Geometry itself may be problematic. For example, consider the case where a 3-D model of a face is combined with a 3-D model of the hair. If the face is too large, the hair unnaturally appears to be buried in the face. Inversely, if the hair is too large, the hair unnaturally appears to hover. Further, if the geometry of an upper side (border) of the face does not match the geometry of a lower side of the hair, part of the hair may hover or be buried, resulting in an unnatural image. It is needless to say that position mismatch causes the image to be unnatural even if the size and the geometry are natural.

Conventionally, the operator adjusts the sizes, positions, and geometry of the vicinity of border portions in order to remove the unnaturalness. Such adjustment is painstaking and time-consuming. Alternatively, a table for the adjustment may be prepared in advance. The combination of components is adjusted with reference to the table. Again, a similar problem arises in which the preparation of the table is painstaking and time-consuming.

A more realistic 3-D model requires a larger number of rough geometric models. The larger the number of rough geometric models, the greater the load on the operator selecting the models.

A face is an object having complex geometry. The generation of a realistic 3-D model of a face is a painstaking task even with the above-described conventional techniques.

SUMMARY OF THE INVENTION

According to one aspect of the present invention, a 3-D model generation device comprises an input section for inputting an image; a memory section for storing a 3-D rough geometric model of a target object in the input image; and a 3-D model generation section for generating a 3-D model of the target object in the input image based on the 3-D rough geometric model. The 3-D model generation section includes a detection means for detecting a size, position, and direction of the target object in the input image, a first calculation means for calculating, when the 3-D rough geometric model is projected onto a 2-D plane in the detected size, position, and direction, the position of each vertex of the 3-D rough geometric model on the 2-D plane; a second calculation means for calculating, when the 3-D rough geometric model is projected onto the 2-D plane in a predetermined size, position, and direction, the position of each vertex of the 3-D rough geometric model on the 2-D plane; a texture image generation means for generating an approximate image as a texture image, the approximate image being approximate to an image obtained by projecting the target object onto the 2-D plane in the predetermined size, position, and direction, by modifying the input image based on a correspondence relationship between the position of each vertex of the 3-D rough geometric model calculated by the first calculation means and the position of each vertex of the 3-D rough geometric model calculated by the second calculation means; and means for mapping the texture image to the 3-D rough geometric model so as to generate a 3-D model of the target object.

According to another aspect of the present invention, a 3-D model generation method comprises the steps of inputting an image; detecting a size, position, and direction of a target object in the input image; calculating, when a 3-D rough geometric model of the target object in the input image is projected onto a 2-D plane in the detected size, position, and direction, the position of each vertex of the 3-D rough geometric model on the 2-D plane; calculating, when the 3-D rough geometric model is projected onto the 2-D plane in a predetermined size, position, and direction, the position of each vertex of the 3-D rough geometric model on the 2-D plane; generating an approximate image as a texture image, the approximate image being approximate to an image obtained by projecting the target object onto the 2-D plane in the predetermined size, position, and direction, by modifying the input image based on a correspondence relationship between the calculated position of each vertex of the 3-D rough geometric model and the calculated position of each vertex of the 3-D rough geometric model; and mapping the texture image to the 3-D rough geometric model so as to generate a 3-D model of the target object.

According to another aspect of the present invention, a computer-readable recording medium storing a program for instructing a computer to execute a 3-D model generation operation for generating a 3-D model of a target object in an image. The 3-D model generation operation includes the steps of inputting an image; detecting a size, position, and direction of a target object in the input image; calculating, when a 3-D rough geometric model of the target object in the input image is projected onto a 2-D plane in the detected size, position, and direction, the position of each vertex of the 3-D rough geometric model on the 2-D plane; calculating, when the 3-D rough geometric model is projected onto the 2-D plane in a predetermined size, position, and direction, the position of each vertex of the 3-D rough geometric model on the 2-D plane; generating an approximate image as a texture image, the approximate image being approximate to an image obtained by projecting the target object onto the 2-D plane in the predetermined size, position, and direction, by modifying the input image based on a correspondence relationship between the calculated position of each vertex of the 3-D rough geometric model and the calculated position of each vertex of the 3-D rough geometric model calculated by the second calculation means; and mapping the texture image to the 3-D rough geometric model so as to generate a 3-D model of the target object.

According to the device, method, and recording medium of the present invention having the above-described characteristics, when there is knowledge of a rough geometric model of a target object in advance, a size, position, and direction of a target object in the input image is detected based on the coordinates of feature points of the target object in the image. A rough geometric model, which is created in advance based on the knowledge of the rough geometric model, is projected onto the 2-D plane in the detected size, position, and direction, and the position (coordinate) of each vertex of the 3-D rough geometric model on the 2-D plane is calculated. The same 3-D rough geometric model is projected onto a 2-D plane in a predetermined size, position, and direction. The position (coordinate) of each vertex of the 3-D rough geometric model on the 2-D plane is calculated. The input image is modified into an approximate image approximate to an image obtained by projecting the target object onto the 2-D plane in the predetermined size, position, and direction, based on a correspondence relationship between the calculated positions (coordinates) of the same vertex on both projected images.

In the 3-D model generation device of the present invention, the 3-D model generation section further includes means for setting a pixel value of a region in the vicinity of and/or outside an outline of the target object in the texture image to a pixel value of a region inside the outline of the texture image.

The 3-D model generation method of the present invention further comprises the step of setting a pixel value of a region in the vicinity of and/or outside an outline of the target object in the texture image to a pixel value of a region inside the outline of the texture image.

In the recording medium of the present invention, the 3-D model generation operation further includes the step of setting a pixel value of a region in the vicinity of and/or outside an outline of the target object in the texture image to a pixel value of a region inside the outline of the texture image.

According to the device, method, and recording medium of the present invention having the above-described characteristics, when there is knowledge of a rough geometric model of a target object in advance, and the same colors are shared in the vicinity of an outline and other regions, pixel-values of texture data in the vicinity of the outline of a generated model are determined based on one or more pixel values inside the outline of the rough geometric model. Thereby, a 3-D model can be generated in which the vicinity of the outline also has a more natural color.

In the 3-D model generation device of the present invention, the memory section stores a plurality of 3-D rough geometric models; each of the plurality of 3-D rough geometric models complies with a predetermined texture mapping rule; and the 3-D model generation section generates the texture image to comply with the texture mapping rule, selects one of the plurality of 3-D rough geometric models stored in the memory section, and maps the texture image to the selected 3-D rough geometric model.

According to the device, method, and recording medium of the present invention having the above-described characteristics, when there is knowledge of a rough geometric model of a target object in advance and when differences between a plurality of rough geometric models indicate variations in geometry of the target object, i.e., the rough geometric models are common to some degree, the following texture mapping rule is defined. Texture is mapped in such a manner that the position of a feature point in any rough geometric model corresponds to the position of a feature point in the texture image. Thereby, the same texture image can be used in any rough geometric model.

According to another aspect of the present invention, a 3-D model generation device comprises a memory section for storing a 3-D model of each of a plurality of parts included in a target object; and a 3-D model generation section for generating a 3-D model of the target object by combining the 3-D models of the plurality of parts with one another in accordance with a predetermined rule. A size, position, and direction of each of the plurality of parts are predetermined, and the 3-D model of each of the plurality of parts has a standardized junction to be combined with another 3-D model. The 3-D model generation device of this invention further comprises means for enlarging, reducing, rotating, or moving the 3-D model of the target object.

According to the device, method, and recording medium of the present invention having the above-described characteristics, when parts to be combined have known properties (e.g., a face and hair), 3-D model data is created in advance so that a junction of each part has the same geometry (geometry of a head skin in the case of a face and hair) and the junctions have the same position in space. With thus prepared 3-D models, any combination of 3-D models of a face and 3-D models of hair allows a 3-D model of a head (the face plus the hair) without modifying of the size, position, and direction thereof. Even when the resulting 3-D model of the whole head is enlarged, reduced, moved, or rotated, the combination junction does not result in mismatch.

According to another aspect of the present invention, a 3-D model generation device comprises an input section for inputting an image of a face; a position designation section for designating the position of at least one portion in the face in the input image; and a 3-D model generation section for generating a 3-D model of the face in the input image based on the input image and the position of the at least one portion in the face in the input image designated by the position designation section. The 3-D model generation means includes an outline detection/determination means for detecting an outline feature of a jaw of the face based on the position of the at least one portion in the face in the input image designated by the position designation section, and determining a shape of the jaw from the detected outline feature of the jaw; and means for selecting a 3-D model corresponding to a result of the determination among the plurality of 3-D models, and generating a 3-D model of the face in the input image based on the selected 3-D model.

According to another aspect of the present invention, a 3-D model generation method comprises the steps of inputting an image of a face; designating the position of at least one portion in the face in the input image; detecting an outline feature of a jaw of the face based on the designated position of the at least one portion in the face in the input image, and determining a shape of the jaw from the detected outline feature of the jaw; and selecting a 3-D model corresponding to a result of the determination among the plurality of 3-D models, and generating a 3-D model of the face in the input image based on the selected 3-D model.

According to another aspect of the present invention, a computer-readable recording medium storing a program for instructing a computer to execute a 3-D model generation operation for generating a 3-D model of a target object in an image. The 3-D model generation operation includes the steps of inputting an image of a face; designating the position of at least one portion in the face in the input image; detecting an outline feature of a jaw of the face based on the designated position of the at least one portion in the face in the input image, and determining a shape of the jaw from the detected outline feature of the jaw; and selecting a 3-D model corresponding to a result of the determination among the plurality of 3-D models, and generating a 3-D model of the face in the input image based on the selected 3-D model.

According to the device, method, and recording medium of the present invention having the above-described characteristics, the operator initially inputs, via the position designation section, positional information which includes feature points (e.g., both eyes, and the center position of a mouth) of a face of a human face in the input image. Next, based on the feature point information, an outline feature (outline or the like) of the face is detected. Next, based on the detection result, the shape of a jaw (e.g., a circle-<shaped type, an egg-shaped type, a square-shaped type, etc., as a type of the face geometry) is determined. Here, the determination of geometry is performed as follows. For example, the detected outline is compared with a plurality of face outlines (reference face outlines) which are prepared in advance. The geometry of a reference face outline closest to the detected outline is regarded as the desired face outline geometry.

A 3-D model of a face corresponding to a reference face outline is prepared in advance. The 3-D model of a face is created by a professional designer in such a manner that an outline feature thereof matches the reference face outline feature. The resulting 3-D model is stored as 3-D model structure information in the memory section.

Finally, based on the determined reference outline geometry, a corresponding 3-D model of a face is determined. Specifically, the desired 3-D model of the face is generated by reading the determined 3-D model structure information of the face from the memory section.

As described above, the operator only inputs several feature points such as eyes or a mouth of a face, so that a 3-D model can easily be generated and utilized.

As a technique for extracting an outline from an outline feature of a face and determining the geometry, there is a technique shown in the above-described Publication 1, for example. Specifically, the outline of an object in a photograph is extracted by the dynamic outline model. The outline of the reference face outline is compared with feature points of an outline distance function. Thereby, the shape of a jaw can be determined.

In the 3-D model generation device of the present invention, the outline detection/determination means includes means for calculating the position of a center of the face based on the position of the at least one portion in the face in the input image designated by the position designation section; means for setting an initial outline of the face; means for calculating a color difference between adjacent pixels on a line passing from the center of the face through a point on the initial outline of the face, and generating a color difference map image including a pixel having a pixel value of the calculated color difference; means for extracting an outline of the face by moving the initial outline of the face in accordance with a dynamic outline model by utilizing the color difference map image; means for calculating a distance function based on the outline of the face; and means for determining a shape of a jaw of the face by comparing the calculated distance function with a distance function created in advance based on a reference outline.

In the 3-D model generation method of the present invention, the outline detection/determination step includes the steps of calculating the position of a center of the face based on the designated position of the at least one portion in the face in the input image; setting an initial outline of the face; calculating a color difference between adjacent pixels on a line passing from the center of the face through a point on the initial outline of the face, and generating a color difference map image including a pixel having a pixel value of the calculated color difference; extracting an outline of the face by moving the initial outline of the face in accordance with a dynamic outline model by utilizing the color difference map image; calculating a distance function based on the outline of the face; and determining a shape of a jaw of the face by comparing the calculated distance function with a distance function created in advance based on a reference outline.

In the recording medium of the present invention, the outline detection/determination step includes the steps of calculating the position of a center of the face based on the designated position of the at least one portion in the face in the input image; setting an initial outline of the face; calculating a color difference between adjacent pixels on a line passing from the center of the face through a point on the initial outline of the face, and generating a color difference map image including a pixel having a pixel value of the calculated color difference; extracting an outline of the face by moving the initial outline of the face in accordance with a dynamic outline model by utilizing the color difference map image; calculating a distance function based on the outline of the face; and determining a shape of a jaw of the face by comparing the calculated distance function with a distance function created in advance based on a reference outline.

In the 3-D model generation device of the present invention, the outline detection/determination means further includes a feature amount detection means for detecting a feature amount of the at least one portion of the face based on the position of the at least one portion of the face designated by the position designation section. The 3-D model generation means further includes means for modifying a structure of the selected 3-D model based on the feature amount of the at least one portion of the face.

According to the device of the present invention having the above-described characteristics, feature amounts of each part of a face designated by the position designation section (e.g., the size of each part such as an eye or a mouth, a distance between each eye such as a distance between both eyes, or the width of a face) are detected. Similarly, the 3-D model selected based on the shape of a jaw is modified based on the detected feature amounts. Therefore, even when the same 3-D model having the egg-shaped type is selected based on the shape of a jaw, the 3-D model can be modified in accordance with differences among individuals having a large or narrow face width, so that the resulting 3-D models reflect the characteristic of the respective faces.

Thus, the invention described herein makes possible the advantages of providing a device and a method for easily generating a realistic and complex 3-D model and a recording medium storing the 3-D model generation method.

These and other advantages of the present invention will become apparent to those skilled in the art upon reading and understanding the following detailed description with reference to the accompanying figures.

BRIEF DESCRIPTION OF THE DRAWINGS

FIG. 17 is a diagram for explaining a technique for calculating a distance function from an extracted outline of a face.

DESCRIPTION OF THE PREFERRED EMBODIMENTS

Hereinafter, embodiments of the present invention will be described with reference to the accompanying drawings. For the sake of simplicity, the target objects are faces.

Figure 1:
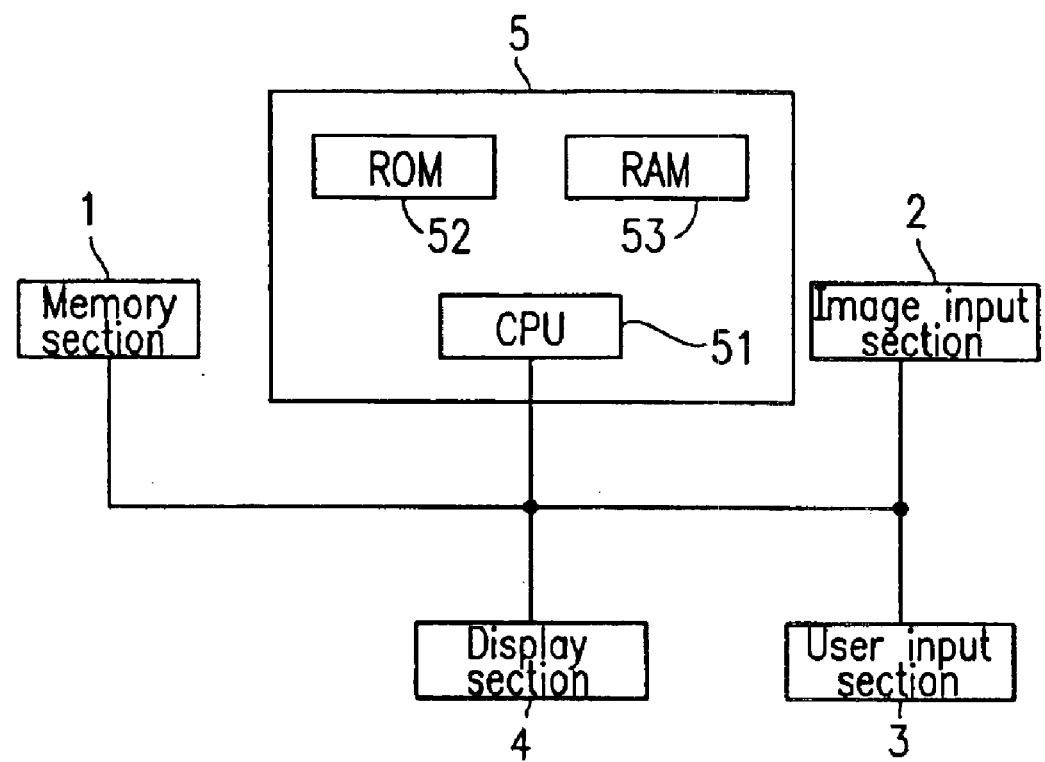
FIG. 1 is a diagram showing a system structure of a 3-D model generation device according to Example 1 of the present invention.

FIG. 1 is a diagram showing a system structure of a 3-D model generation device according to Example 1 of the present invention.

The 3-D model generation device of Example 3 includes a memory section 1, an image input section 2, a user input section 3, a display section 4, and a 3-D model generation section 5.

The memory section 1 stores in advance various data including a rough geometric model of a target object in an image.

Examples of the image input section 2 include a digital still camera, a scanner, and a video capture. In Example 1, any still picture input means can be used.

The user input section 3 is a section for inputting various information by the user's operation. Pointing devices such as key boards or mice are herein used. Other various input devices may be adopted.

The display section 4 includes a CRT or liquid crystal display. A generated 3-D model, or options to be selected by the operator, are displayed by the display section 4.

The 3-D model generation section 5 includes a CPU 51 as a processor, a ROM 52 storing a 3-D model generation program, and a RAM 53 used as a working area upon operation of the program. In the 3-D model generation section 5, various calculations are performed in accordance with the 3-D model generation program stored in the ROM 52 based on image information input from the image input section 2, various information input from the user input section 3, and various data stored in the memory section 1.

In terms of function, the 3-D model generation section 5 includes a detection means for detecting a size, position, and direction of the target object in the input image; a first calculation means for calculating, when the 3-D rough geometric model is projected onto a 2-D plane in the detected size, position, and direction, the position of each vertex of the 3-D rough geometric model on the 2-D plane; a second calculation means for calculating, when the 3-D rough geometric model is projected onto the 2-D plane in a predetermined size, position, and direction, the position of each vertex of the 3-D rough geometric model on the 2-D plane; a texture image generation means for generating an approximate image as a texture image, the approximate image being approximate to an image obtained by projecting the target object onto the 2-D plane in a predetermined size, position, and direction, by modifying the input image based on a correspondence relationship between the position of each vertex of the 3-D rough geometric model calculated by the first calculation means and the position of each vertex of the 3-D rough geometric model calculated by the second calculation means; and means for mapping the texture image to the 3-D rough geometric model so as to generate a 3-D model of the target object. The 3-D model generation section 5 further includes means for setting a pixel value of a region in the vicinity of and/or outside an outline of the target object in the texture image to a pixel value of a region inside the outline of the texture image.

Figure 2:
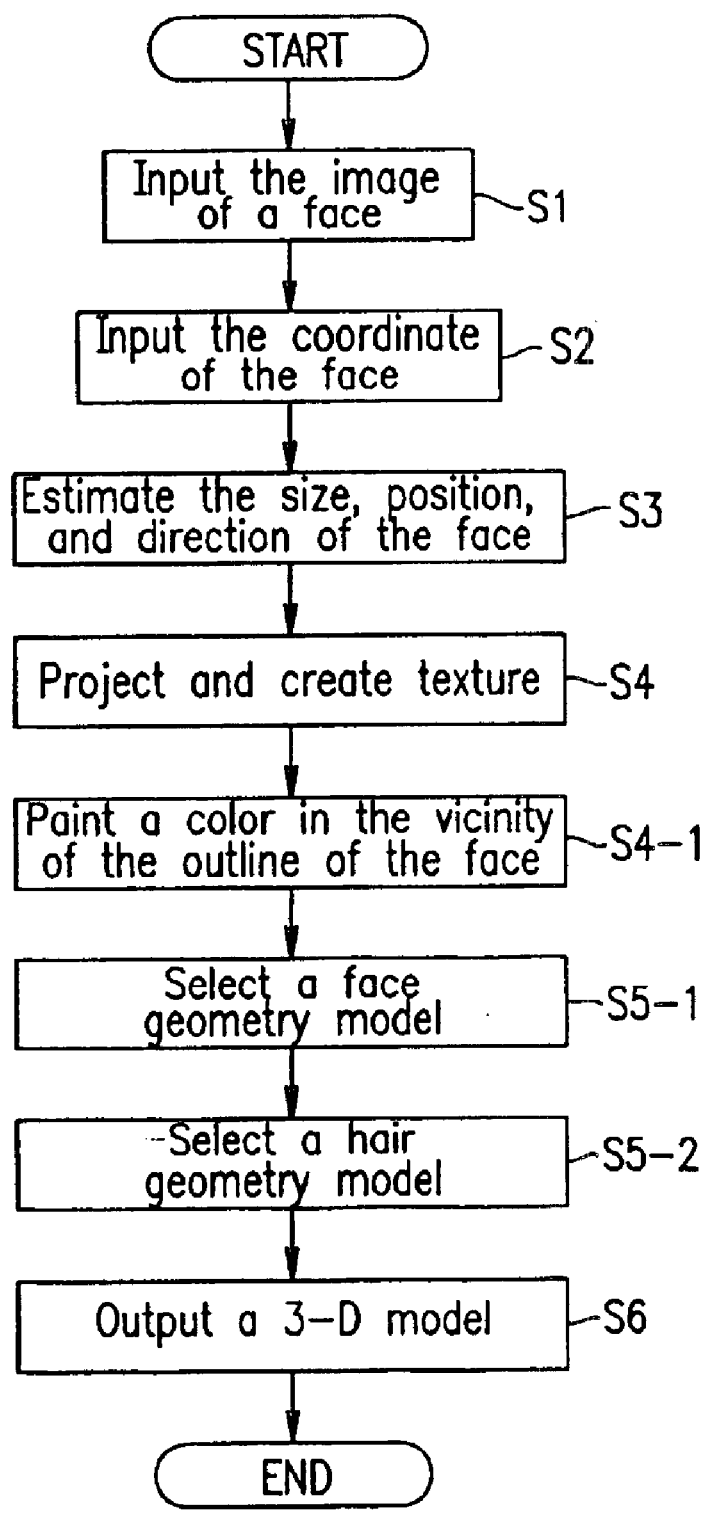
FIG. 2 is a flowchart showing a 3-D model generation operation of the 3-D model generation device in shown FIG. 1.

FIG. 2 is a flowchart showing a 3-D model generation operation (operation for processing a 3-D model generation program stored in the ROM 52) of the 3-D model generation device thus constructed. The flowchart is used in the following description.

Figure 3A:
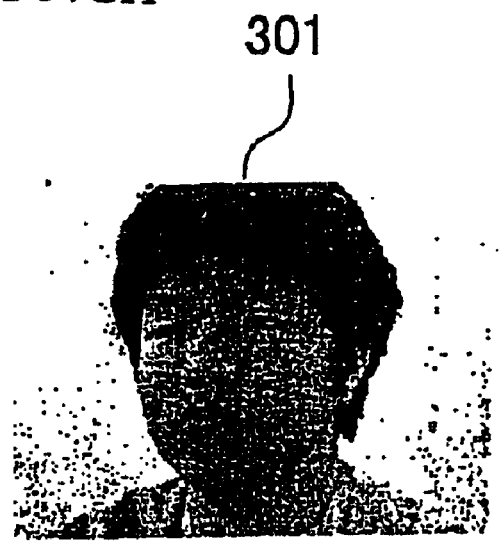
FIG. 3A is a diagram for explaining an example of an image input from an image input section.

The operator initially inputs a face image using the image input section 2 (step S1). The input face image is displayed on the display section 4. FIG. 3A shows an example of the input image (face image) 301 displayed on the display section 4.

Figure 4:
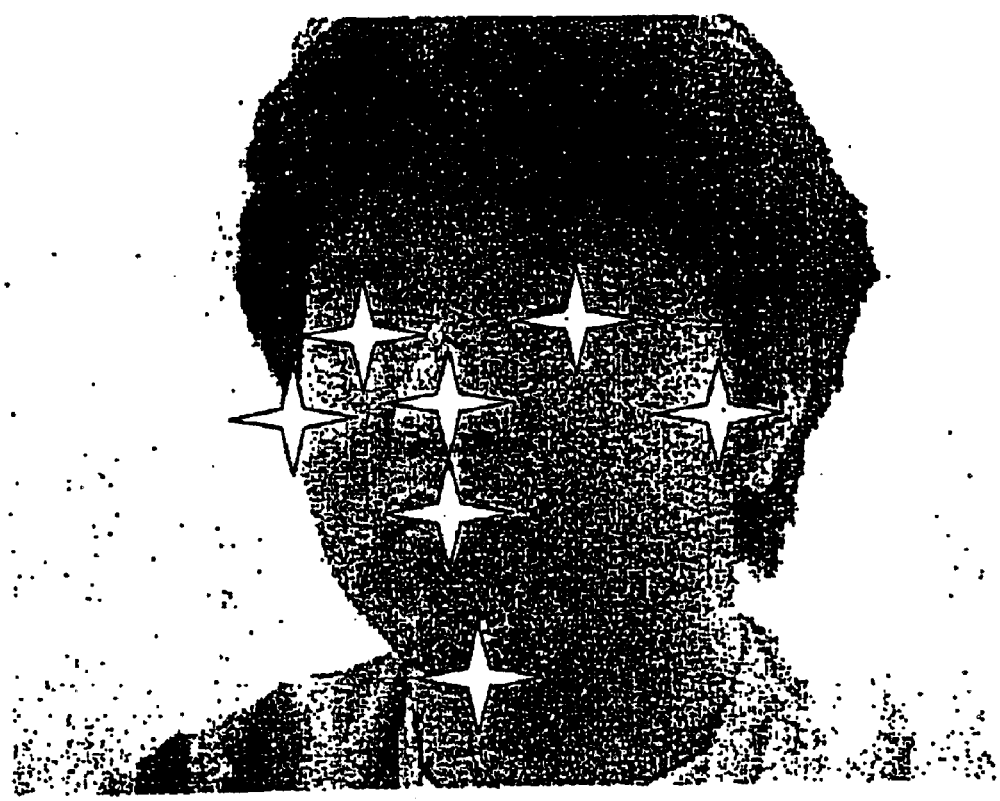
FIG. 4 is a diagram for explaining an example of specification of coordinates of an input image.

Next, the operator designates coordinate points with respect to the face image 301 (step S2). Specifically, the operator inputs the coordinates of points on a nose, a mouth, an outline, or the like of the displayed face image 301. FIG. 4 shows an example of designated coordinate points. Cross marks on the input image are coordinate points designated by the operator. In Example 1, seven points are designated on both eyes, a nose, a mouth, a tip of a jaw on an outline, and the vicinity of right and left ears.

Next, based on such input information on the coordinate points of a face, the size, position, and direction of the face are estimated (detected) (step S3). Various techniques may be used to achieve such estimation. In Example 1, a 3-D standard face geometric model is projected onto a 2-D plane trying to match the size, position, and direction thereof to those estimated. The differences in coordinates between the eyes, nose, and mouth of the standard face geometric model and the points designated by the operator (points on the eyes, the nose, and the mouth) are calculated. Next, the standard face geometric model is projected onto the 2-D plane, shifting the size, position, and direction thereof from those estimated. Similarly, the differences in coordinate between the eyes, nose, and mouth of the standard face geometric model and the points designated by the operator (points on the eyes, the nose, and the mouth) are calculated. When a calculated size, position, and direction make the difference minimum, those are used as a next estimated size, position, and direction. The above-described processing is repeated. When the difference is not decreased any more, the current size, position, and direction are determined as the final size, position, and direction of the face in the input image.

Figure 3C:
FIG. 3C is a diagram for explaining a texture image generated from an input image.
Figure 3B:
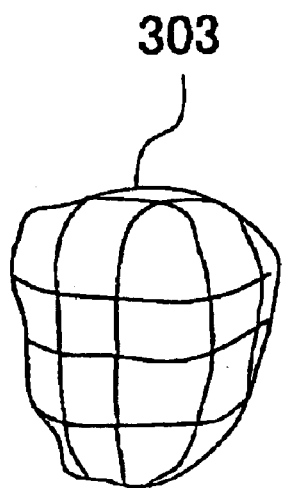
FIG. 3B is a schematic diagram showing a result of standard face geometry data projected at a presumed position and direction.
Figure 3D:
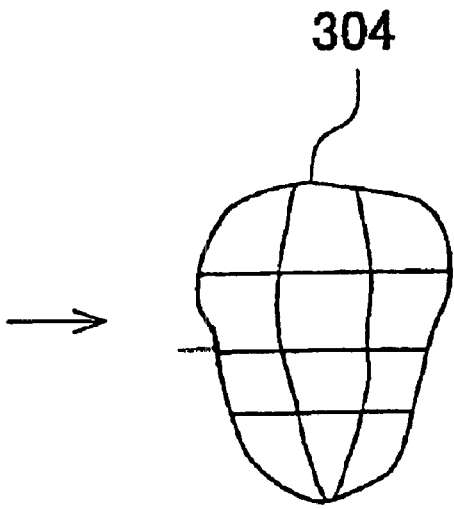
FIG. 3D is a schematic diagram showing a result of standard face geometric model having a predetermined size projected from the front at a predetermined position.

After the size, position, and direction of the face is thus estimated in step S3, the standard face geometric model is projected onto the 2-D plane to generate a texture image (step S4). Specifically, the standard face geometric model is projected onto the 2-D plane trying to match the size, position, and direction thereof to those estimated in Step S3. The coordinate of each vertex on the 2-D plane of the standard face geometric model is calculated. A 3-D model indicated by reference numeral 303 in FIG. 3B is a schematic diagram showing a result of the standard face geometric model projected trying to match the position and direction thereof to those estimated. The standard face geometric model is projected (from the front in Example 1) onto the 2-D plane trying to match the size, position, and direction thereof to those predetermined. The coordinate of each vertex of the standard face geometric model is calculated. A 3-D model indicated by reference numeral 304 in FIG. 3D is a schematic diagram showing a result of the standard face geometric model projected trying to match the size, position and direction thereof to those estimated.

The face image input from the image input section 2 is modified into a texture image, based on a correspondence relationship between the position of each vertex of the standard face geometric model projected trying to match the size, position, and direction thereof to the size, position, and direction of the face estimated in step S3 and the position of each vertex of the standard face geometric model projected trying to match the size, position, and direction thereof to the predetermined size, position, and direction. The texture image is an approximate image approximate to an image obtained by projecting a face of the target object onto the 2-D plane trying to match the size, position, and direction thereof to the predetermined size, position, and direction. In other words, the figure shown by FIG. 3B is transferred to the figure shown by FIG. 3D in association with image tuning. The image tuning herein used is a well-known technique in the field of image processing which is easily practiced by those skilled in the art. Therefore, a more specific description of the image tuning is omitted.

Figure 5:
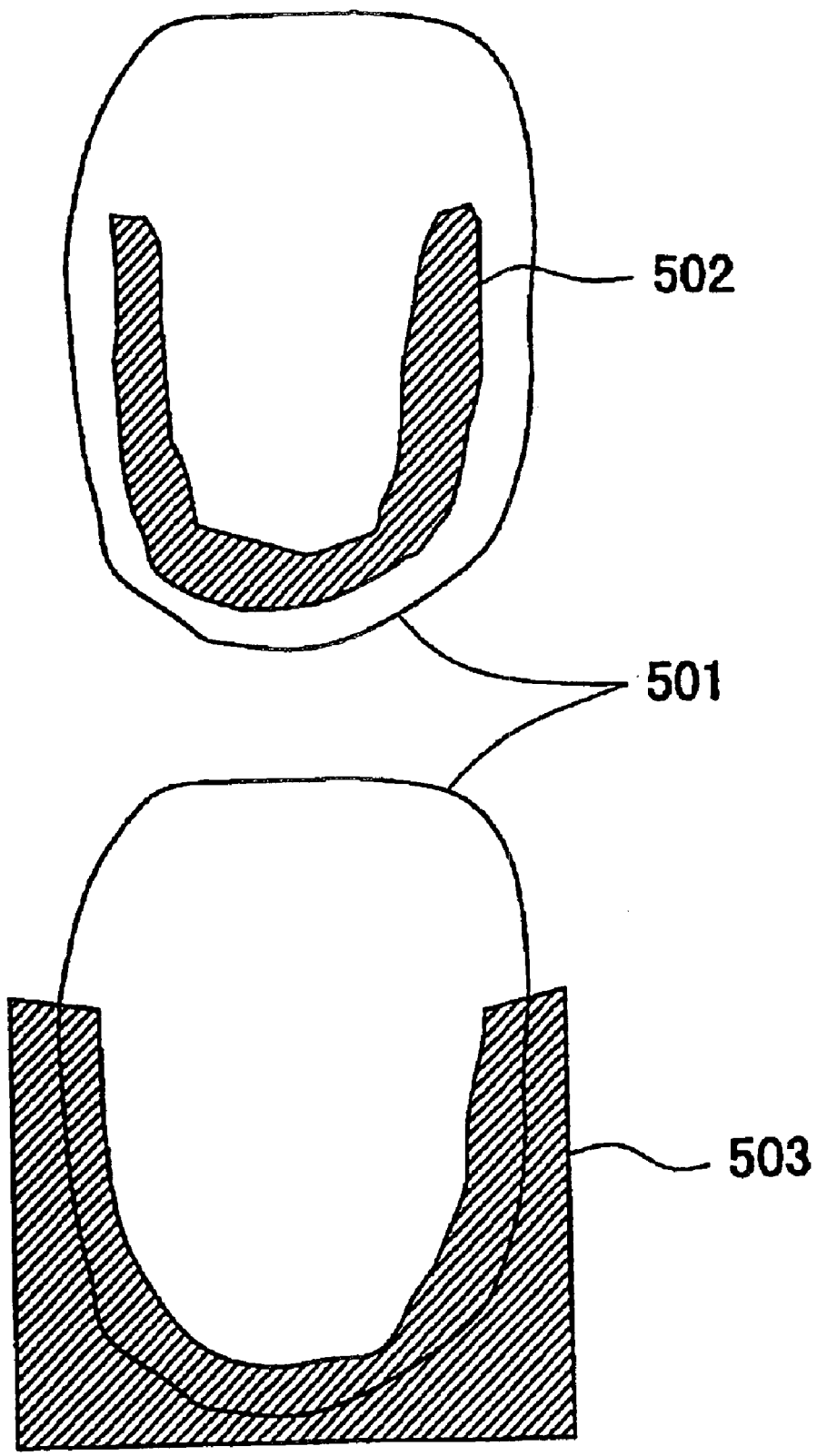
FIG. 5 is a diagram for explaining an example of an area in the vicinity of an outline from which pixel values are taken.

The resulting model as it has texture whose color is unstable in the vicinity of the outline of the face of the target object in the texture image. The vicinity of the outline of the target object is painted a color of the target so that the color inn the vicinity of the outline of the target object becomes stable (step S4-1). FIG. 5 is a schematic diagram for explaining such processing. Specifically, an area 502 is positioned a little toward the center of the target object from the outline 501 of the target object. The pixel values in the area 502 are averaged. The values of the pixels (an area indicated by reference numeral 503) in the vicinity and outside of the target object are set to the averaged pixel value. The resulting image is approximate to an image obtained by projecting the target object, trying to match the size, position and direction thereof to those predetermined. The resulting image is used as a texture image which is mapped to the standard face geometric model by parallel projecting the texture image from the front. FIG. 3C shows an example of a texture image 302 generated from the input image 301 (see FIG. 3A).

Next, a model is selected from a plurality of face geometric models (rough geometric models). In Example 1, a face geometric model is first automatically selected (hereinafter referred to as a "automatic face geometric model selection step"). Thereafter, a face geometric model is selected in accordance with a selection instruction input by the operator (step S5-1). In this case, the operator may use the face geometric model automatically selected. Alternatively, the operator may select another face geometric model by inputting selection instruction via the user input section 3.

The automatic face geometric model selection step (step S5-1) will be performed as follows.

Initially, edge detection is performed in the vicinity of a portion corresponding to the outline of a face which is the target object in the input image. Various techniques for the edge detection are well known. The edge detection is therefore easily practiced by those skilled in the art. A detailed description of the edge detection is omitted. In addition to the edge detection, there are various techniques for outline detection. Those techniques can easily be applied to the outline detection of Example 1.

Figure 6:
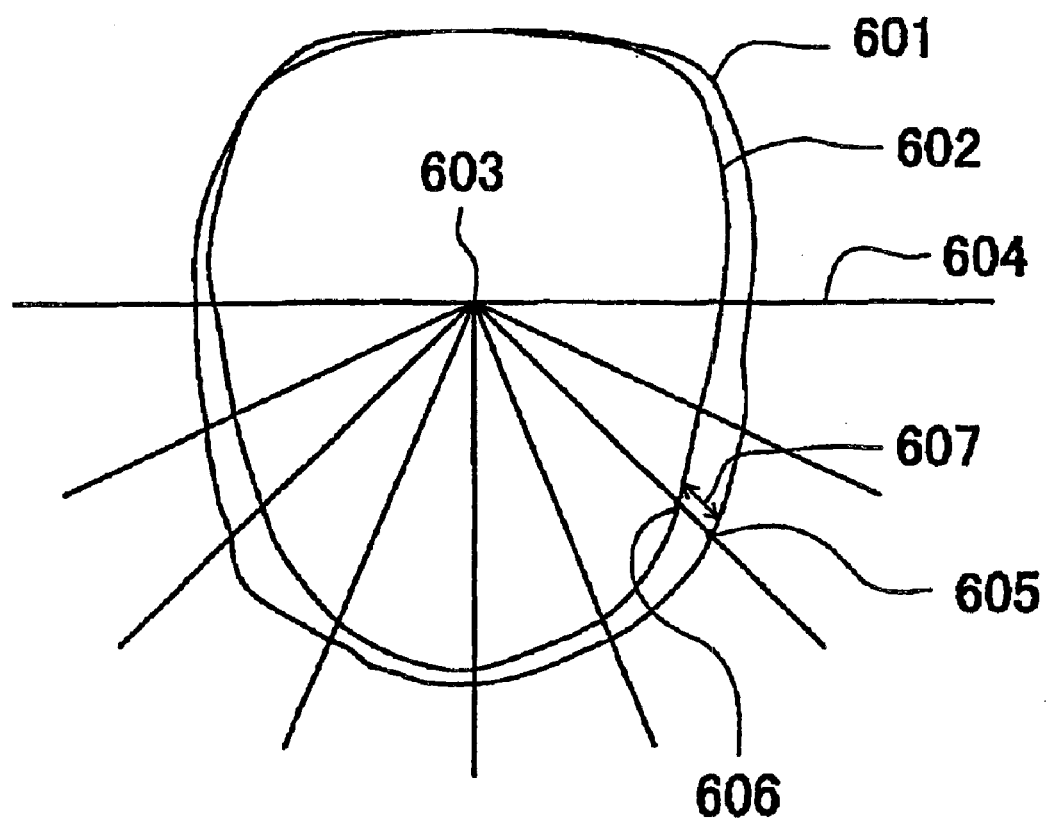
FIG. 6 is a diagram for explaining how outlines are compared with each other.

Next, the geometry of the detected edge is compared with the geometry of the outline of the face geometric models which can be selected. In Example 1, lines are drawn extending in radial directions from the center of a face (the lines are hereinafter referred to as the "radial lines"). The sum of the squares of the distances between the detected edge and the outline of the face geometric model on the radial lines are calculated for the comparison. FIG. 6 schematically shows how the comparison is performed. In FIG. 6, reference numeral 601 indicates the detected outline; reference numeral 602 indicates the outline geometry of the face geometric model; reference numeral 603 indicates the center of the face; reference numeral 604 indicates one of the radial lines; reference numeral 605 indicates an intersection between another radial line and the detected outline; reference numeral 606 indicates an intersection between another radial line and the outline geometry 602 of the face geometric model; and reference numeral 607 indicates the distance between the intersections 605 and 606. For the sake of simplicity, some parts of FIG. 6 are omitted. Nevertheless, for all the radial lines, intersections with the outline 601 and intersections with the outline geometry 602 of the face geometric model are calculated, and the distances between the intersections are also calculated. The sum of squares of all the distances between the intersections is calculated. The above-described calculation is performed for all the 3-D face geometric model which are prepared in advance and can be selected. A 3-D face geometric model having the minimum sum of squares is selected. Up to this point, the automatic face geometric model selection step is described. There are various alternative techniques which can easily be applied to the geometric model selection of Example 1.

In Example 1, the face geometric model (rough geometric model) includes additional information used for mapping a texture image thereto in advance in order that an image projected from the front in a predetermined size and position can be used as a texture image. Therefore, when an image is projected from the front in a predetermined size and position, a correct 3-D face geometric model can be generated regardless of which image is combined with which model. Only the same texture data is required for any selected face geometric model. The operator does not need to make another texture image for each model and does not need to fine adjust the mapping of a texture image regardless of models selected by the automatic model selection step.

Figure 7:
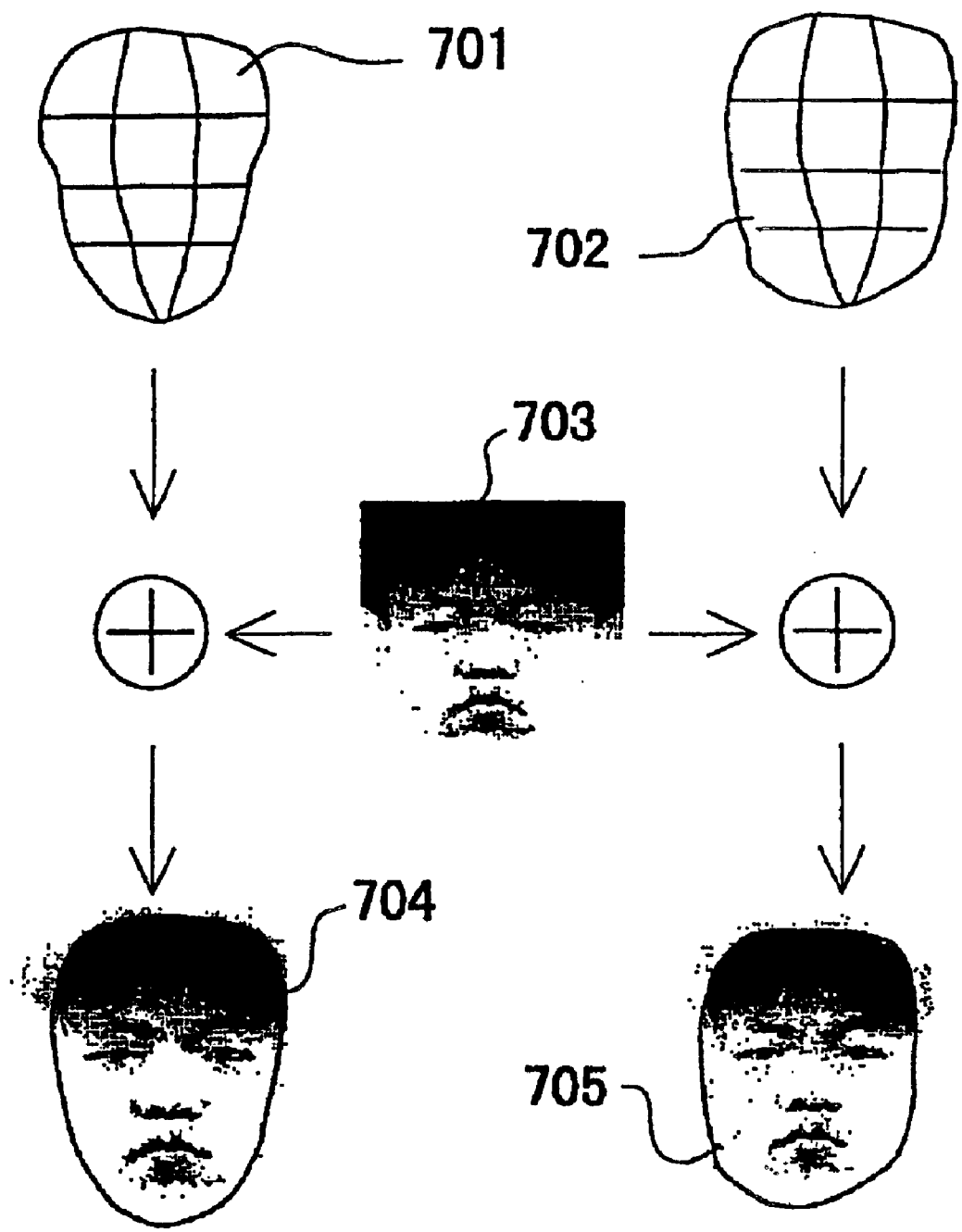
FIG. 7 is a schematic diagram for explaining how a 3-D model is generated from a plurality of rough face geometric models using a single texture image.

FIG. 7 schematically shows the above-described situation. It is assumed that there are a plurality of 3-D face geometric models (two models 701 and 702 in FIG. 7). When either 3-D face geometric model is selected, the model is combined with a single texture image 703, so that a 3-D face model 704 or 705 can be obtained.

Next, a geometric model is selected for hair (step S5-2). All the geometric models and all patterns of hair have the same geometry and position of the junction surfaces thereof. In this case, the junction surfaces may not be always fully identical. Some junction surfaces may include only a portion of the same geometry. Alternatively, geometry other than the geometry of the above-described junction surfaces may be adopted which does not mismatch between the geometric model of a face and the geometric model of hair. Such geometry can easily be applied to selection of the geometric models of hair of Example 1.

Thus, the junction surfaces have the same geometry. Therefore, when any 3-D model of hair is selected and any 3-D face geometric model is selected, substantially no adjustment of size and position is required. A 3-D model of a face having an attached hair can be generated by a simple combination of both 3-D models.

Figure 8:
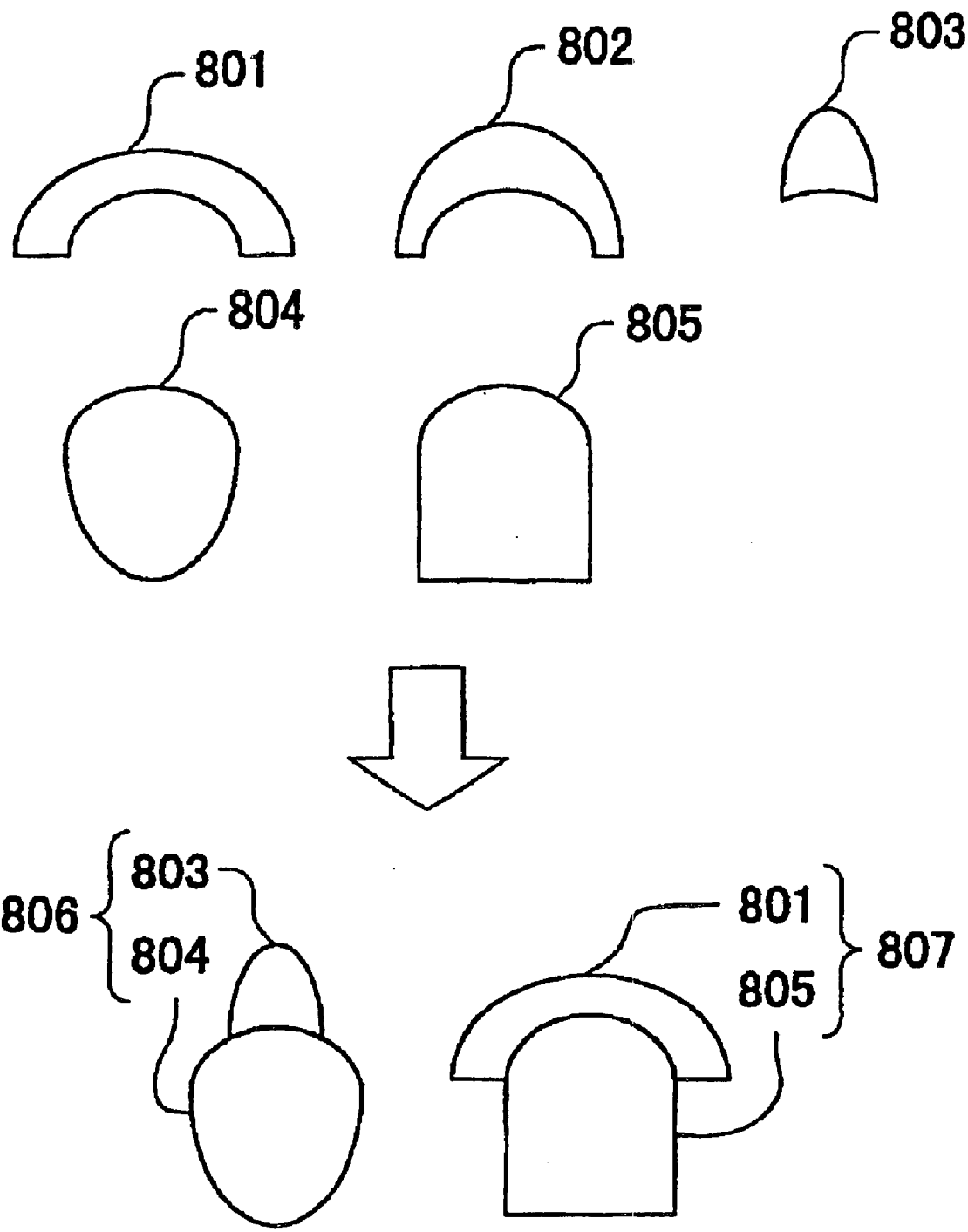
FIG. 8 is a schematic diagram for explaining a technique for combining an arbitrary face with arbitrary hair.

FIG. 8 schematically shows the above-described situation. Reference numerals 801 through 803 indicate 3-D models of hair. Reference numerals 804 and 805 indicate 3-D models of faces. The 3-D models 801 through 803 of hair have the same junction portion (surface). The junction portion of the 3-D model 803 of hair is a part of the junction portions of the other 3-D models 801 and 802 of hair. Reference numerals 806 and 807 indicate examples of combinations of the 3-D models of the hair and the 3-D models of faces. Reference numeral 806 indicates a combination of the 3-D model 803 of hair and the 3-D model 804 of a face. Reference numeral 807 indicates a combination of the 3-D model 801 of hair and the 3-D model 805 of a face. Thus, when any 3-D model of hair and any 3-D model of a face are combined with each other, substantially no mismatch occurs between the junction portions since all the 3-D models have the same geometry, resulting in preferable 3-D models of heads.

Finally, the 3-D model of a head obtained by a combination of the 3-D models of a face and hair is enlarged or reduced horizontally. Such enlargement/reduction is performed based on outline information of an input image obtained in the automatic face geometric model selection step (step S5-1). When the width of a face in an input image is greater than a predetermined standard width, the 3-D model is horizontally enlarged. When the width of a face in an input image is narrower than a predetermined standard width, the 3-D model is horizontally reduced. An enlargement/reduction may be used as it is, or alternatively, the enlargement/reduction rate may be changed. For example, the operator inputs the desired enlargement/reduction rate via the user input section 3.

Figure 9:
FIG. 9 is a diagram for explaining an example of a 3-D model of a head.

The texture image thus generated, the face geometric model and the hair geometric model selected automatically or by the operator, and the enlargement/reduction rate selected automatically or by the operator are used to generate a 3-D model of a head (Step S6). The 3-D model of a head is displayed on the display section 4 or is output from an output section (not shown) as required. FIG. 9 shows an example of a 3-D model 901 of a head thus generated.

EXAMPLE 2

Figure 10:
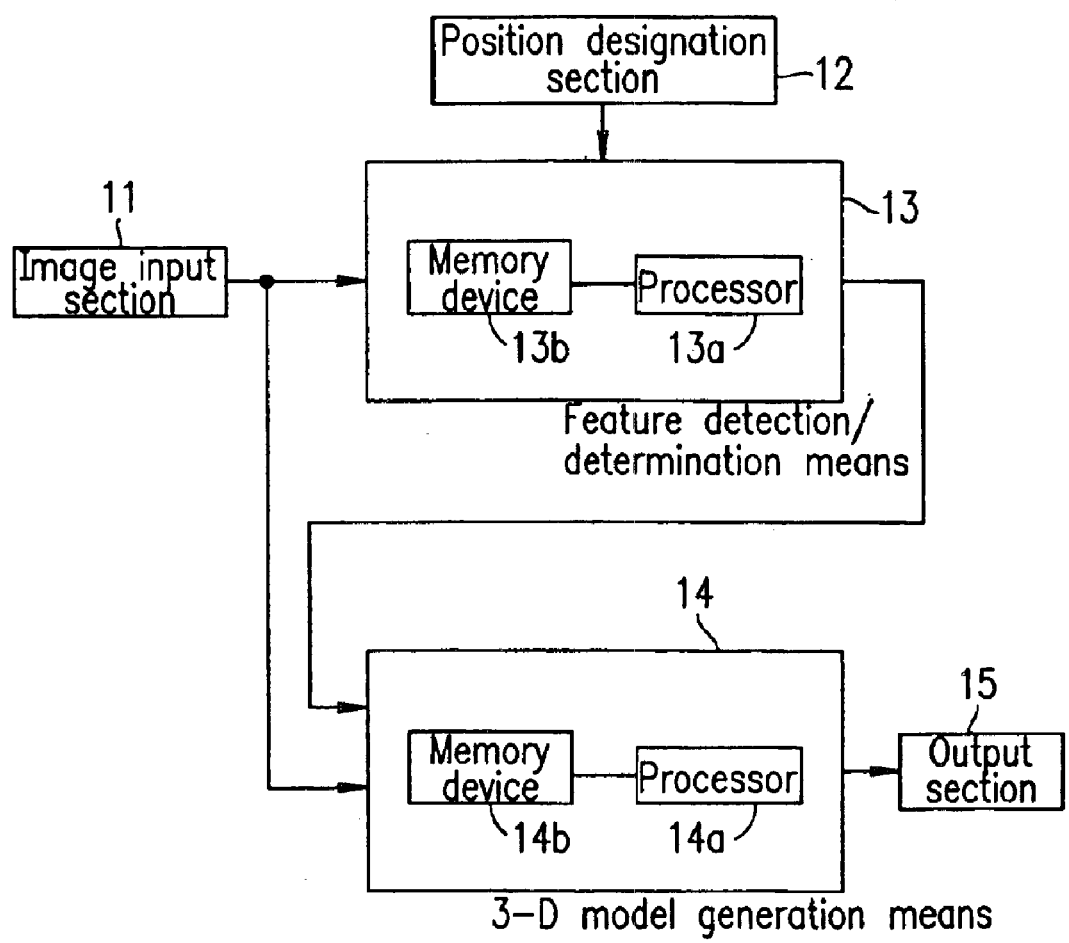
FIG. 10 is a diagram showing a system structure of a 3-D model generation device according to another example of the present invention.

FIG. 10 is a system structure diagram showing another embodiment of a 3-D model generation device of the present invention.

In Example 2, an outline feature of the jaw of a human face is detected in an externally input image, i.e., an image taken by a device from the outside (input image). The shape of the jaw is determined. Thereafter, based on a result of the determination, a 3-D model of the human face in the input image is generated.

The 3-D model generation device of Example 2 includes an image input section 11 as a means for taking an electronic image; a position designation section 12 as a means for designating an arbitrary position in the input image; an outline detection/determination means 13 for detecting a feature amount of the input image and determining the shape of a jaw; a 3-D model generation means 14 for generating a 3-D model based on a feature; and an output section 15 for externally outputting the generated 3-D model.

The feature detection/determination means 13 and the 3-D model generation means 14 include processors 13a and 14a, and memory devices (ROM, RAM, etc.) 13b and 14b, respectively, for use in processing. A 3-D model generation program is stored in the ROMs of the memory devices 13b and 14b.

In terms of function, the feature detection/determination means 13 includes means for calculating the position of a center of the face based on the position of the at least one portion in the face in the input image designated by the position designation section 12; means for setting an initial outline of the face; means for calculating a color difference between adjacent pixels on a line passing from the coordinate of the center of the face through a point on the initial outline of the face, and generating a color difference map image including a pixel having a pixel value of the calculated color difference; means for extracting an outline of the face by moving the initial outline of the face in accordance with a dynamic outline model by utilizing the color difference map image; means for calculating a distance function based on the outline of the face; and means for determining the shape of the jaw of the face by comparing the calculated distance with a distance function created in advance based on a reference outline.

Figure 11:
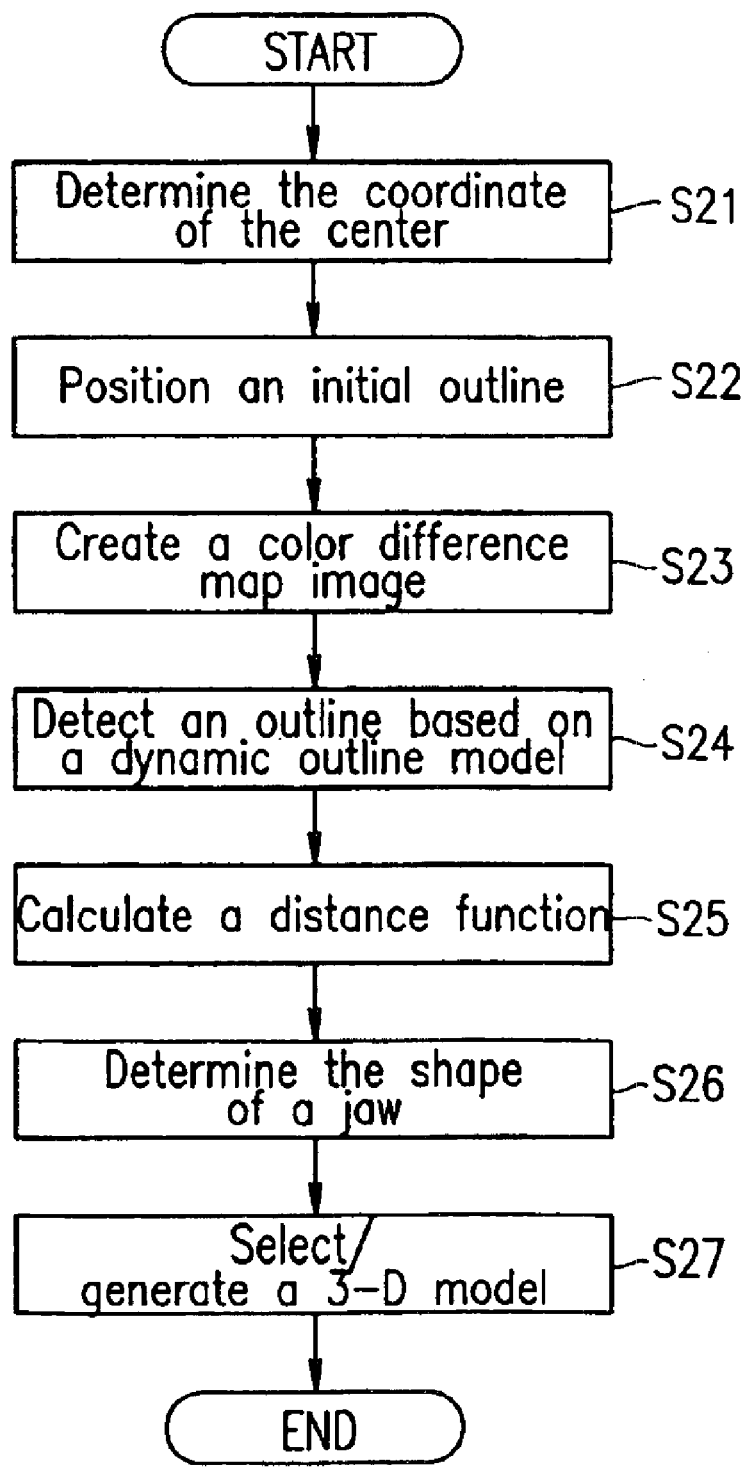
FIG. 11 is a flowchart showing a 3-D model generation operation of the 3-D model generation device shown in FIG. 10.

FIG. 11 is a flowchart showing a 3-D model generation operation of the 3-D model generation device thus constructed. The flowchart is used in the following description.

Figure 12:
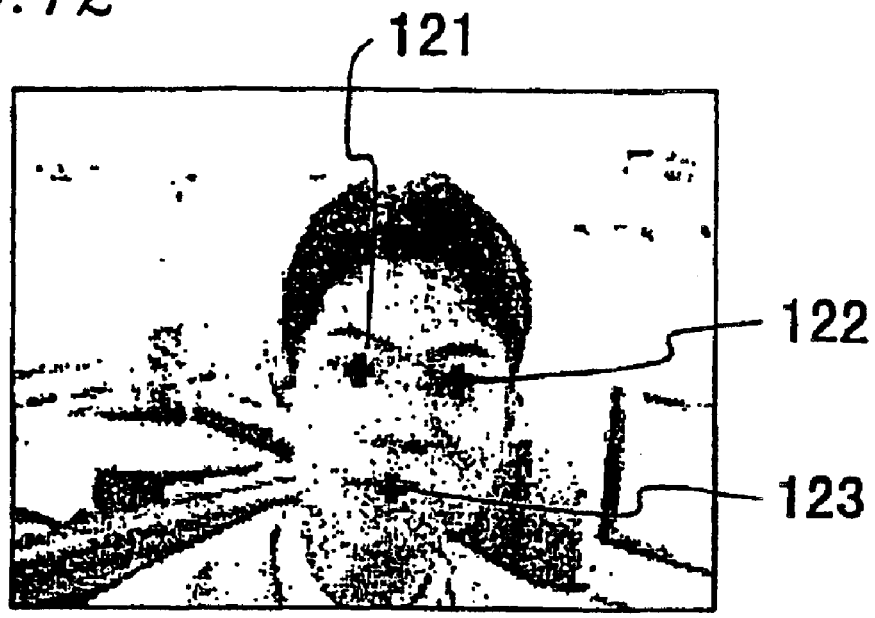
FIG. 12 is a diagram for explaining an example of position specification.

It is assumed that a target object (hereinafter in Example 2 referred to as the "original image") has been input to the memory devices 13b and 14b via the image input section 11. In this situation, the operator designates the positions of feature points (eyes, a mouth, etc.) of a face in the original image via the position designation section 12. The center position of the face is then determined (step S21). The operator may directly designate the center position of the face. Alternatively, the operator may designate the coordinates of the centers (indicated by reference numerals 121, 122, and 123 in FIG. 12) of a right eye, a left eye, and a mouth. The center of these points is calculated and may be regarded as the center position of the face.

Figure 13:
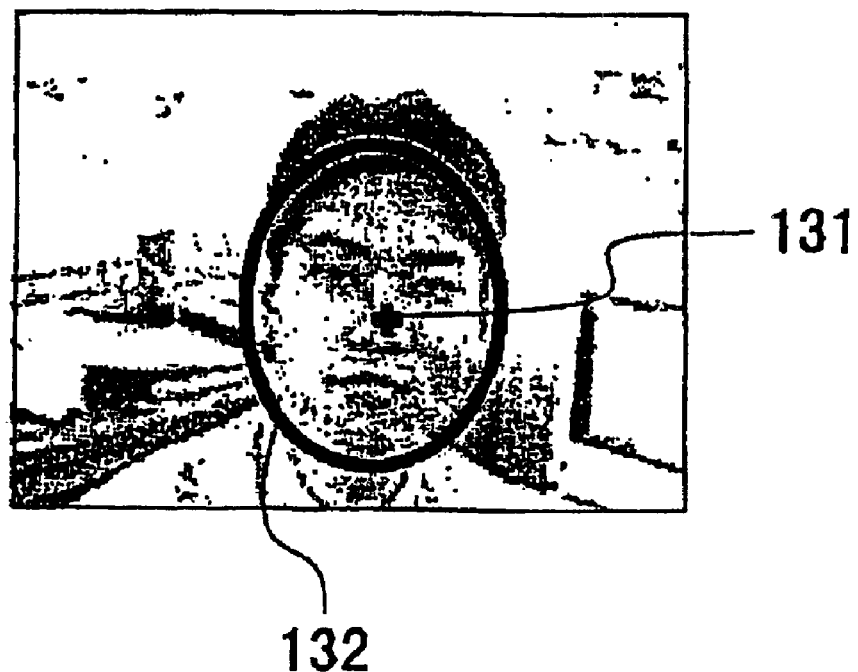
FIG. 13 is a diagram for explaining the coordinate of the center of an input image and the position of the initial outline of the input image.

After the center position of the face is determined in this way, an initial outline is placed in the vicinity of the outline of the face (step S22) as an initial position. The initial outline is, for example, a closed loop surrounding the eyes and the mouth. Specifically, the relative distances between eyes and a mouth is statistically investigated in advance. An ellipse outline is created and positioned in such a manner to surround eyes and a mouth. FIG. 13 shows an image in which a center position 131 and an initial outline 132 are determined.

Next, color differences between adjacent pixels on a line passing from the coordinate of the face of the face through each coordinate on the initial outline are calculated based on the original image, the center position 131 and the initial outline 132. A color map image having the calculated color differences as pixel values is created (step S23). The coordinate of a pixel of the color difference map image corresponds to the coordinate of a middle point between adjacent pixels on a line passing from the coordinate of the center of the face through a coordinate on the initial outline.

The color difference is calculated, for example, in the following way. A subtraction is performed between the brightness of each pixel of image data for each monochromatic light to calculate a difference value. The sum of the difference values for all the monochromatic light is calculated as the color difference. Alternatively, the pixel data is converted into HSV values which are represented by hue (H), saturation (S), and brightness (V). The positions of two pixels whose color difference is to be calculated are determined in an HSV space. The value of the distance between the two pixels in the HSV space may be defined as the color difference. Instead of adjacent pixels, a plurality of consecutive pixels may be regarded as a unit. An average color may be calculated for each unit. A color difference may be calculated between each average color.

Upon calculation of the color difference, detection precision of the color difference may be changed by utilizing the fact that the target is a human face. For example, when the pixel values of two pixels whose color difference is to be calculated are close to a pixel value representing flesh color, it is considered that the two pixels are highly likely to be inside the face outline. Therefore, the detection precision of the color difference may be reduced so that an influence such as noise can reduced. The possibility that a jaw and a neck both have pixel values representing flesh color is high. When trying to detect a border between the jaw and the neck, the detection precision may be increased. Accordingly, when the color difference detection is performed on a line from the center toward the neck, the detection precision of the color difference is increased so as to make it easier to detect the border between the jaw and the neck. If the coordinate of the mouth is already known, a direction to the neck position can be estimated based on the coordinate of the mouth.

Figure 14:
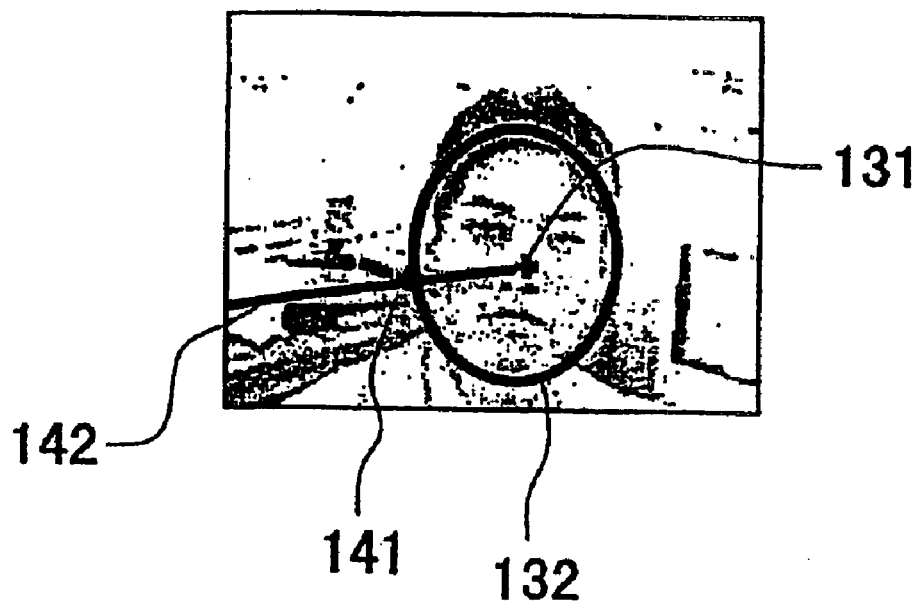
FIG. 14 is a diagram for explaining a technique for calculating color differences on a line passing from a point on the initial outline through the coordinate of the center shown in FIG. 13.
Figure 15:
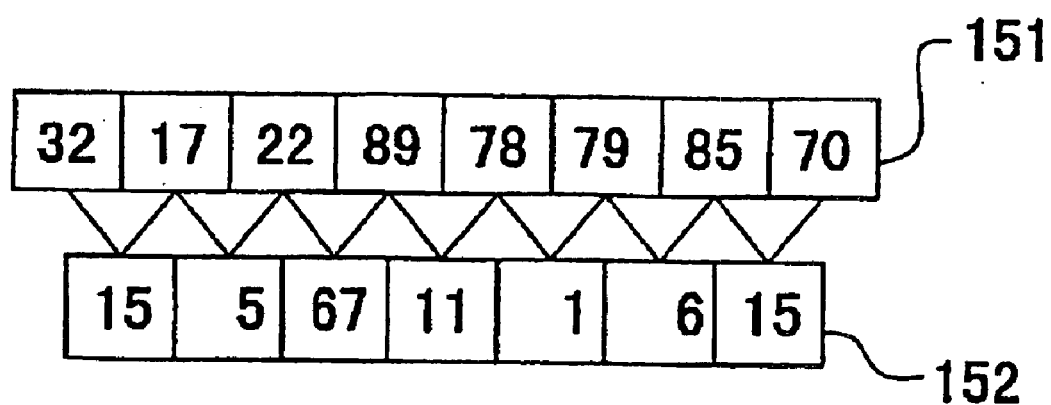
FIG. 15 is a diagram for explaining the color difference calculation technique shown in FIG. 14.

In FIG. 14, for example, it is considered that color differences are calculated on a line 142 connecting between the center of the face 131 and a coordinate point 141 on the initial outline 132. FIG. 15 is a schematic diagram showing an array 151 of pixels on the line 142 (FIG. 14) and an array 152 of difference values between adjacent pixels. That is, the array 152 indicates an array of color differences.

Figure 16A:
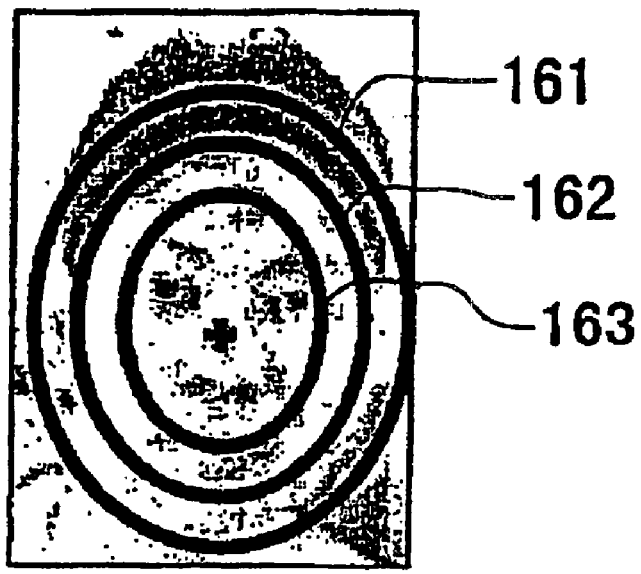
FIGS. 16A and 16B are diagrams for explaining a color difference calculation technique specialized in face outline geometry where a face is assumed to be in the form of an ellipse.
Figure 16B:
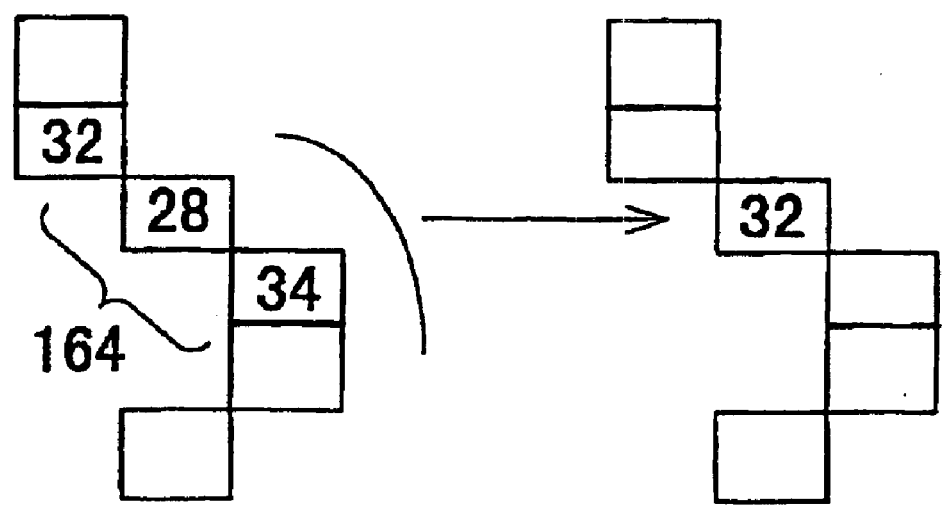

Further, a color map image may be specialized in face outline geometry by utilizing features inherent to a human face outline after the above-described detection of the color differences. For example, it is assumed that a face is similar to an ellipse. As shown in FIGS. 16A and 16B, on ellipse curves 161 through 163 which have arbitrary size and whose center is the center of the face, the color differences of one point and two adjacent points (indicated by reference numeral 164) may be averaged. The resulting average value may be stored again as the color difference of the one point, thereby suppressing an influence of noise. In FIG. 16B, the color differences of the three points are 32, 28, and 34, respectively. In this case, the average is 32 [(32+28+34)/3= 31.33 . . . (rounding up the fractions)].

As described above, the fact that a target object is a human face is used as a constraint condition. Therefore, a more stable color difference map image specialized in detection of features of the shape of a jaw can be generated from an input image having an unclear outline or having much noise.

Next, with the color map image thus generated, an outline is extracted (detected) by moving the initial outline in accordance with a dynamic outline model (step S24).

An energy function E is now defined as the sum of internal energy E1 representing the smoothness of an outline, energy E2 causing the outline to shrink, and image energy E3 characterizing the outline (E=E1+E2+E3). The initial outline is moved to attempt to find a minimum value of E. A Snake method is herein used as a technique for performing outline extraction using a dynamic outline model. The Snake method is disclosed in Publication 2 (M. Kass, "Snakes: Active Contour Models", Int. J. Comput. Vision, p. 321, 1998).

The color map image generated in step S23 is used to calculate the image energy E3. Specifically, the image energy E3(P) of an arbitrary point P(x, y) on the image is calculated using expression (1):

$$E3(P)=\alpha \times (\text{MAX}(D)-D(P)) \quad (1)$$

where D(P) is the color difference value in the color difference map image corresponding to P; MAX(D) is the maximum value of the color difference in the color difference map image; and a coefficient $\alpha$ is the degree of the image energy in the energy function E.

In accordance with expression (1), the smaller the color difference of a point, the greater the image energy of the point. Therefore, the outline tends to move from a point having a small color difference toward a direction of minimum energy. Conversely, the greater the color difference of a point, the smaller the image energy of the point. The outline resists movement from a point having a great color difference. Specifically, a border of a color region, such as a border between a face region and a background region, has a small image energy. The outline is likely to converge at such a border.

As described above, when the color map image obtained in step S23 as an image energy is used, an energy image including a feature of the shape of a jaw can be created. Therefore, a jaw can stably be detected even from an input image whose outline is unclear or from an image having much noise.

Next, a distance function is calculated based on the outline thus obtained (step S25). Specifically, the outline is represented, for example, by a function $r=L(\theta)$ where r is the distance from a known coordinate existing inside a face, such as the center of a face; and $\theta$ is the direction (angle). This situation is schematically illustrated in FIG. 17.

$r(=L(\theta))$ is calculated by changing the value of $\theta$ in a unit angle basis. For example, the unit angle is narrowed in a range having a more characteristic shape of a jaw (in a direction toward a neck from the center of a face), so that information amount is larger than that in the other directions. Alternatively, a distance function may be represented by a Fourier descriptor given by:

$$L(\theta) = \sum_n [A(n) \times \exp(j(2\pi n(s/L)))] \quad (2)$$

where A(n) is the coefficient representing a curve geometry; exp( ) is the power of the base of the natural logarithm; s is the distance on the curve; and L is the whole length of the closed curve. The details of the Fourier descriptor is disclosed in Publication 3 (Supervising editors, Mikio TAKAGI and Yosuke SHIMODA, "Handbook of Image Analysis", Tokyo University Shuppankai, 1991).

Next, the shape of a jaw is determined by comparing the thus-obtained feature of the distance function with a reference distance function (step S26). The reference distance function is herein a distance function which is prepared from the outline of a reference jaw in advance. The outline of the reference jaw is obtained, for example, in the following way. Images whose outlines are manually detected in advance are categorized into groups having a similar shape of jaw, such as a base-shaped type, a circle-shaped type, or the like. Outlines in each category are averaged. The resulting average outlines are used as reference outlines.

As for comparison of a distance function with a reference function, positions of inflection points of a distance function, the number of inflection points, the gradient between the inflection points, and the like are features of the distance function. Such features are compared between a distance function and a reference function. Before performing the comparison, a reference function needs to be normalized to match the position of a distance function.

The positions or number of inflection points, or the gradients between the inflection points are calculated for reference geometry in advance, and such information is stored in a memory (memory device 13b). This information is compared with information on the inflection points of the distance function obtained in step S25 as required. As a result of the comparison, the shape of a jaw is determined based on the distance function closest to the reference distance function.

Figure 18:
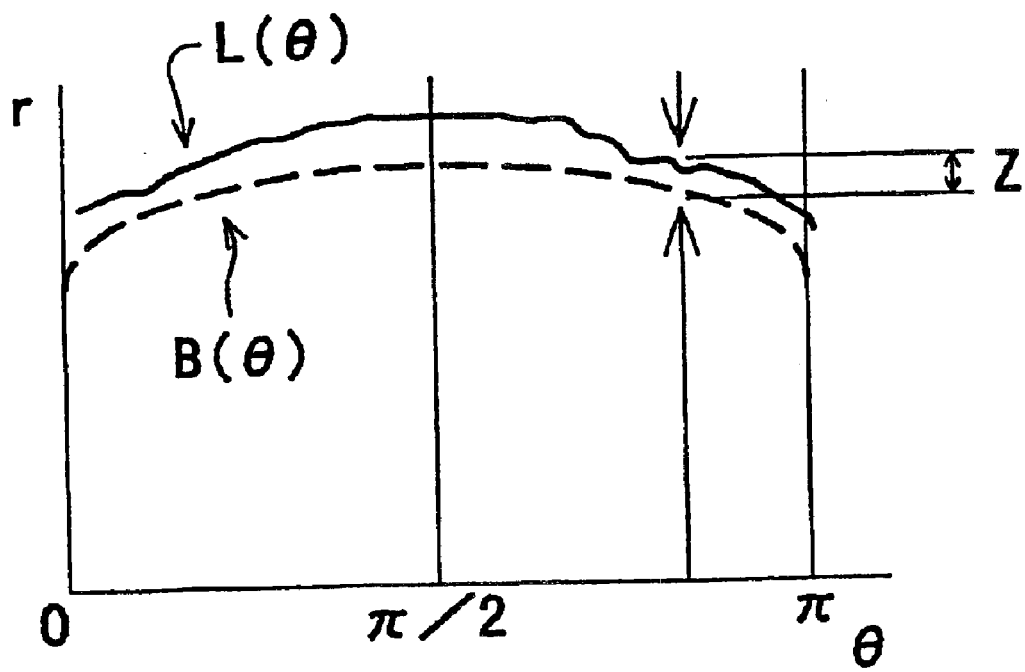
FIG. 18 is a diagram for explaining a technique for comparing a distance function obtained from an input image with a reference distance function.

Comparison of a distance function with a reference function may be performed by simply calculating the sums of differences between the distance function and the reference function. FIG. 18 schematically shows this situation. Reference numeral Z indicates a distance between a distance function and a reference distance function. When the reference distance function is represented by $B(\theta)$, the sum Z1 of differences is given by:

$$Z1 = \sum_\theta |B(\theta) - L(\theta)|. \quad (3)$$

In this case, geometry having $B(\theta)$ which attains the minimum Z1 may be defined as the optimum geometry. In this technique, although values of $B(\theta)$ in the range of $\theta$ needs to be prepared for each reference geometry in a memory (memory device 13b), geometry can be categorized in more detail and the determination is easy.

When a distance function is represented by a technique which describes a curve on a plane as a frequency region, such as a Fourier descriptor, the distance function can be characterized by Fourier coefficients thus calculated. Similar to the foregoing, the geometry of an outline can be determined by comparing the Fourier coefficients of the outline with those calculated for distance functions of geometry of reference outlines.

A reference function is represented by the Fourier descriptor, and the resulting Fourier coefficients are indicated by Ab(n). The difference Z2 with the Fourier coefficients of a target distance function is calculated by expression (4) below:

$$Z2 = \sum_{n} |Ab(n) - A(n)|, \qquad (4)$$

and the geometry having Ab(n) which attains the minimum of Z2 is determined as the optimum geometry.

In general, the Fourier coefficients of lower order terms reflect rough geometry of a curve while the Fourier coefficients of higher order terms reflect detailed geometry of the curve. Therefore, if the range of n which is used in the above-described calculation is narrowed, i.e., lower order terms are used, to calculate Z2, the optimum result can be obtained by removing noise, differences among individuals, or the like as much as possible.

The above-described operations (step S21–S26) are performed by the feature detection/determination means 13. The resulting shape of a jaw obtained based on the feature points is transferred to the 3-D model generation means 14.

The 3-D model generation means 14 determines a 3-D model based on the shape of a jaw. Thus, the desired 3-D model is generated (step S27).

Figure 19:
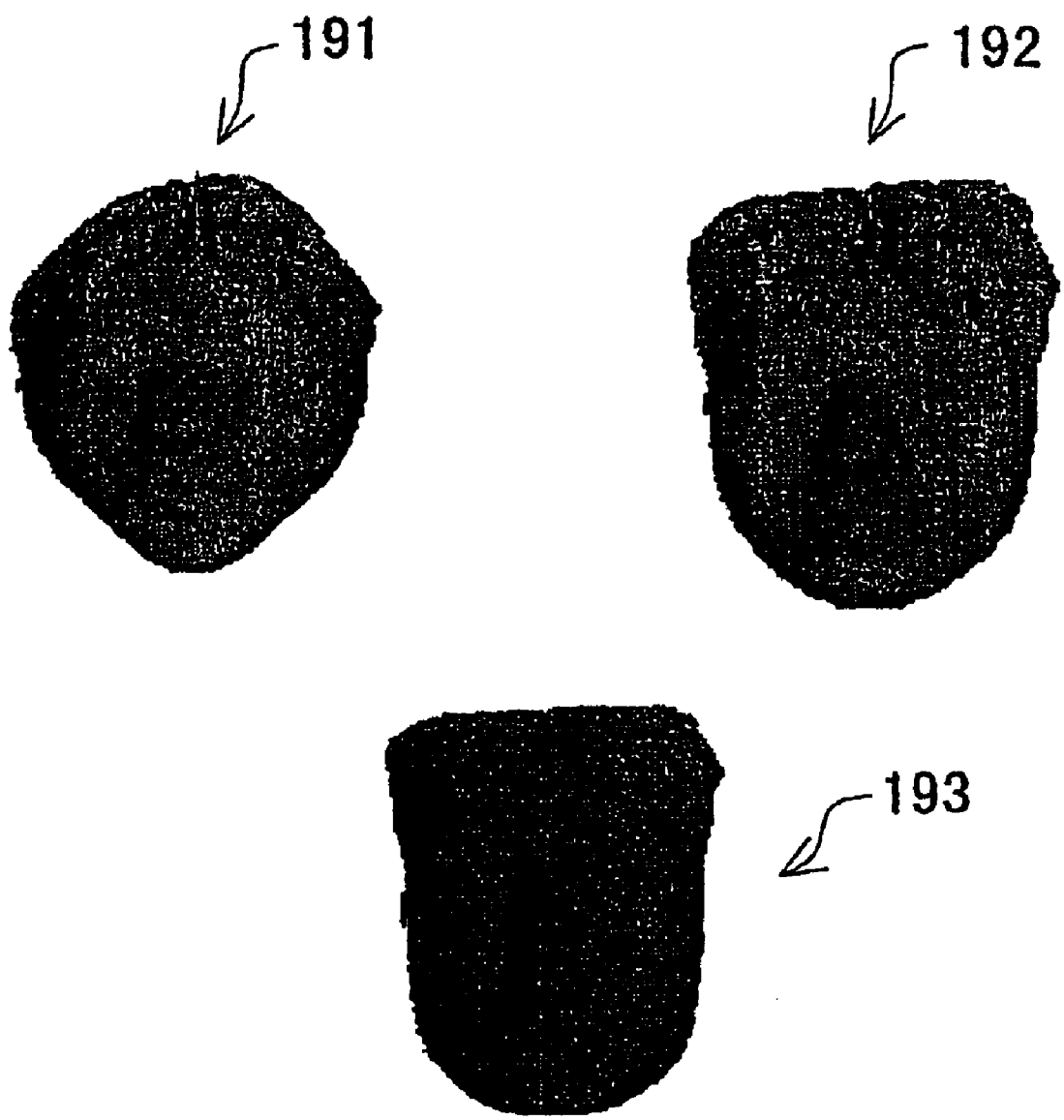
FIG. 19 is a diagram for explaining an example of a 3-D model of a face based on a result of determination of the shape of a jaw.

Specifically, structure information of 3-D models having various shapes of jaws created by professional designers or the like is stored in the memory device 14b in advance. 3-D face model structure information corresponding to the shape of a jaw determined is retrieved from the memory device 14b and the 3-D face model is reproduced. The resulting model is displayed by the output section 15 such as a CRT. Here, when the face corresponding to the shape of a jaw determined is of an egg-shaped type, a circle-shaped type, or a squire-shaped type, a 3-D model of the face having the corresponding type is generated as shown in FIG. 19. In FIG. 19, reference numeral 191 indicates a 3-D model of the egg-shaped type; reference numeral 192 indicates a 3-D model of the circle-shaped type; and reference numeral 193 indicates a 3-D model of the square-shaped type.

In this way, the shape of a jaw is stably detected and determined from 2-D information such as a photographic image. Based on the resulting shape, a 3-D model of a face can be generated.

As described above, 3-D face models of the same egg-shaped type, for example, which are determined based on the shape of a jaw, even have different face widths, i.e., larger or narrower, depending on individuals. Therefore, differences among individuals may be taken into account in generation of a 3-D model. For example, a basic 3-D model structure which is prepared in advance may be modified using the feature amount of each part of a face.

To this end, distances among each part of a face, such as a distance between eyes or a distance between an eye and a mouth, or ratios of distances may be detected in addition to the shape of a jaw by the feature detection/determination means 13 shown in FIG. 10. The results of the detection may be used by the 3-D model generation means 14 in generation of a 3-D model. In this case, the 3-D model generation means 14 needs to perform the fine-tuning in the generation of the 3-D model.

Specifically, the distances between each part are calculated based on the positional information of each part designated by the operator using the position designation section 12. Here there are some certain constraint conditions on relationships in position between each part and on the size of each part with respect to a human face. Therefore, positional relationship between each part (e.g., the positional relationship among both eyes and a mouth, a proportion of the distance between both eyes to the width of a face, and the like) can be estimated if each part falls within a certain range. Specifically, positional relationships among each part which are inherent in a face are measured in advance for a plurality of human faces (e.g., a proportion of the distance between both eyes to the width of a face). The averages or variances of values of the positional relationships are also calculated in advance. In this case, for example, the width of a face can be estimated based on the distance between both eyes, so that the operator does not need to input such information. Thus, the operator's task can be reduced when feature amounts of each part of a face is detected.

Thereafter, a 3-D model of a face is modified based on the thus detected feature amounts of each part of a face. A basic 3-D model to be modified is selected based on a result of the above-described determination of the shape of a jaw.

Here, proportions of distances between each part, e.g., a proportion of the distance between both eyes to the distance between an eye and a mouth (aspect ratio), are used as the feature amounts of each part of a face. This situation will be described below.

The average values of proportions which have been calculated in advance for a plurality of human faces are compared with a proportion of a human face in an input image. A whole 3-D model of the input human face is enlarged or reduced in accordance with the comparison between the proportions.

Figure 20:
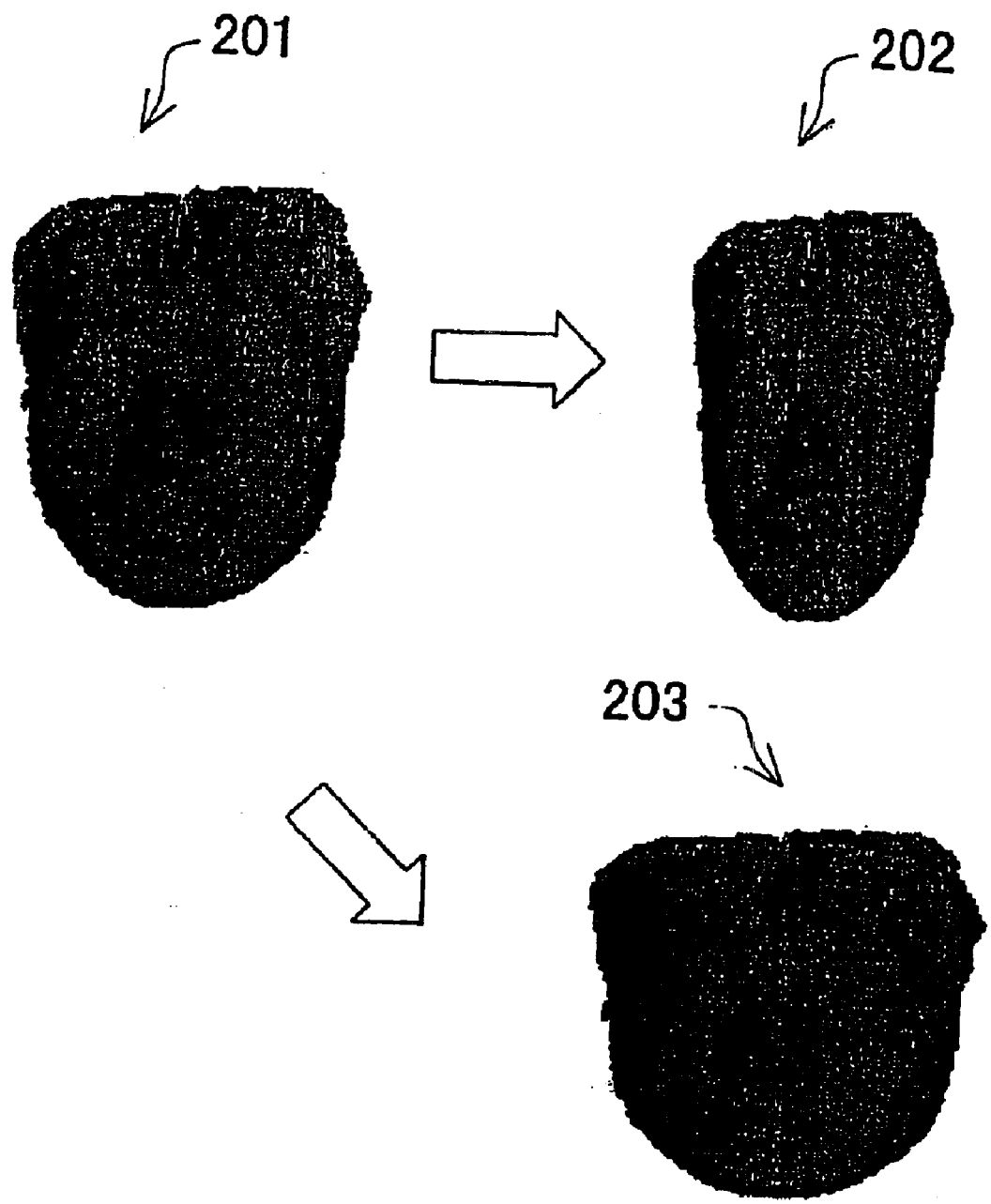
FIG. 20 is a diagram for explaining an example of a 3-D model modified based on an amount of a feature of a face.

For example, it is assumed that a 3-D model indicated by reference numeral 201 in FIG. 20 is selected as a reference 3-D model for the human face in the input image. When the aspect ratio obtained from the feature amount has great length as compared with the average aspect ratio, an example of a modified 3-D model is indicated by reference numeral 202 in FIG. 20. When the aspect ratio has great width as compared with the average aspect ratio, an example of a modified 3-D model is indicated by reference numeral 203 in FIG. 20.

In this way, a reference 3-D model can be modified based on information on the position of each part of a face designated by the operator via the position designation section 12. Therefore, even when the same 3-D model is selected for different faces, the 3-D model can be modified in accordance with differences among individuals having a large or narrow face width, so that the resulting 3-D models reflect the characteristic of the respective faces.

The 3-D model generation devices of Examples 1 and 2 perform the 3-D model generation by using a 3-D model generation program stored in the memory section 1 and the memory devices 13b and 14b. The program may be stored in a computer-readable recording medium. In the present invention, although this recording medium is not shown, the 3-D model generation device includes a program read device. The recording medium may be a program medium which can be inserted into and read by the program read device. Alternatively, as in Examples, the program may be stored in a memory means such as a program memory included in the device. In either case, the stored program may be directly accessed and executed. Alternatively, the program is read out and downloaded into a main memory (not shown) where the program is in turn executed. In this case, a program for downloading is stored in the device in advance.

Here the above-described program medium is a recording medium which is separated from the 3-D model generation device. The program medium may be a tape such as a magnetic tape or a cassette tape, a magnetic disk such as a floppy disk or a hard disk, an optical disk such as a CD-ROM, an MO, an MD, or a DVD, a card such as an IC card or an optical card, or a medium, in which a program is stored in a fixed form, such as a mask ROM, an EPROM, an EEPROM, or a flash ROM (semiconductor memories).

When the 3-D model generation device of the present invention further includes a means for communicating with the outside (wireless communication capability or wire communication capability via public lines such as the Internet), the program medium may store a program which is downloaded from the outside connected via such a means. A program for downloading may be stored in the device in advance or may be installed from another medium when a target program is downloaded via a communication network.

The 3-D model generation device, 3-D model generation method, and recording medium storing a 3-D model generation program of the present invention have various effects described below.

Even when an image taken in a direction other than a predetermined direction is used as an input image, the image can be handled similar to the case where the image is taken from the predetermined direction, and a 3-D model of the image can easily be generated.

Even when an image taken in a direction other than a predetermined direction is used as an input image, the image can be handled similar to the case where the image is taken from the predetermined direction, and a 3-D model of the image can be generated. In addition, even when there is a difference between rough geometry and geometry of a target object, a color of a region other than the target object is prevented from creeping into the vicinity of a generated 3-D model of the target object. Therefore, a 3-D model having a higher quality can be generated.

Further, when an image taken from a predetermined direction is used, a single set of texture data may be prepared for a plurality of models. Tasks required for generation of a 3-D model is greatly reduced.

Furthermore, an image taken from a direction other than a predetermined direction can be used for creating texture data. Therefore, 3-D models are generated from various images. As to a combination of geometric models, the geometric models are designed to match one another. Therefore, the operator does not need to perform modification or matching. The task of the operator is greatly reduced. As to a combination of geometric models, since geometric models to be combined are prepared by generating 3-D models from various images, the task of the operator is greatly reduced. Further, a model close to a target object in an input image is automatically selected. The operator does not need to select geometric models, thereby reducing the task of the operator.

The operator inputs only several points such as eyes or a mouth of a face. Thereafter, a jaw is stably detected and the shape of a jaw is determined from a 2-D face image such as a photograph. A 3-D model can easily be generated based on the determination result. The operator inputs only several points such as eyes or a mouth of a face. Thereafter, a 3-D model can easily be generated from a 2-D face image such as a photograph, reflecting characteristics of the face image.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A 3-D model generation device comprising:
   an input section for inputting a 2-D image;
   a memory section for storing a 3-D rough geometric model of a target object in the input 2-D image; and
   a 3-D model generation section for generating a 3-D model of the target object in the input 2-D image based on the 3-D rough geometric model,
   wherein the 3-D model generation section includes:
      a detection means for detecting a size, position, and direction of the target object in the input 2-D image;
      a first calculation means for calculating, when the 3-D rough geometric model is projected onto a 2-D plane in the detected size, position, and direction, the position of each vertex of the 3-D rough geometric model on the 2-D plane;
      a second calculation means for calculating, when the 3-D rough geometric model is projected onto the 2-D plane in a predetermined size, position, and direction, the position of each vertex of the 3-D rough geometric model on the 2-D plane;
      a texture image generation means for generating an approximate image as a texture image, the approximate image being approximate to an image obtained by projecting the target object onto the 2-D plane in the predetermined size, position, and direction, by modifying the input 2-D image based on a correspondence relationship between the position of each vertex of the 3-D rough geometric model calculated by the first calculation means and the position of each vertex of the 3-D rough geometric model calculated by the second calculation means; and
      means for mapping the texture image to the 3-D rough geometric model calculated by the second calculating means so as to generate a 3-D model of the target object.

2. A 3-D model generation device according to claim 1 wherein the 3-D model generation section further includes means for setting a pixel value of a region in the vicinity of and/or outside an outline of the target object in the texture image to a pixel value of a region inside the outline of the target object in the texture image.

3. A 3-D model generation device according to claim 1, wherein the memory section stores a plurality of 3-D rough geometric models, each of the plurality of 3-D rough geometric models complies with a predetermined texture mapping rule; and
   the 3-D model generation section generates the texture image to comply with the texture mapping rule, selects one of the plurality of 3-D rough geometric models stored in the memory section, and maps the texture image to the selected 3-D rough geometric model.

4. A 3-D model generation device comprising:
   an input section for inputting an image of a face;
   a position designation section for designating the position of at least one portion in the face in the input image; and
   a 3-D model generation section for generating a 3-D model of the face in the input image based on the input image and the position of the at least one portion in the face in the input image designated by the position designation section, wherein the 3-D model generation means includes:
an outline detection/determination means for detecting an outline feature of a jaw of the face based on the position of the at least one portion in the face in the input image designated by the position designation section, creating an energy image including the outline feature of the jaw from the image energy of a color difference map, and determining a shape of the jaw from the detected outline feature of the jaw; and means for selecting a 3-D model corresponding to a result of the determination among the plurality of 3-D models, and generating a 3-D model of the face in the input image based on the selected 3-D model.

5. A 3-D model generation device, comprising:

an input section for inputting an image of a face;

a position designation section for designating the position of at least one portion in the face in the input image; and a 3-D model generation section for generating a 3-D model of the face in the input image based on the input image and the position of the at least one portion in the face in the input image designated by the position designation section, wherein the 3-D model generation means includes:
an outline detection/determination means for detecting an outline feature of a jaw of the face based on the position of the at least one portion in the face in the input image designated by the position designation section, and determining a shape of the jaw from the detected outline feature of the jaw; and means for selecting a 3-D model corresponding to a result of the determination among the plurality of 3-D models, and generating a 3-D model of the face in the input image based on the selected 3-D model, wherein the outline detection/detection means includes:

means for calculating the position of a center of the face based on the position of the at least one portion in the face in the input image designated by the position designation section;

means for setting an initial outline of the face;

means for calculating a color difference between adjacent pixels on a line passing from the center of the face through a point on the initial outline of the face, and generating a color difference map image including a pixel having a pixel value of the calculated color difference;

means for extracting an outline of the face by moving the initial outline of the face in accordance with a dynamic outline model by utilizing the color difference map image;

means for calculating a distance function based on the outline of the face; and means for determining a shape of a jaw of the face by comparing the calculated distance function with a distance function created in advance based on a reference outline.

6. A 3-D model generation device according to claim 5, wherein the outline detection/determination means further includes a feature amount detection means for detecting a feature amount of the at least one portion of the face based on the position of the at least one portion of the face designated by the position designation section, and the 3-D model generation means further includes means for modifying a-structure of the selected 3-D model based on the feature amount of the at least one portion of the face.

7. A 3-D model generation method comprising the steps of:

inputting a 2-D image;

detecting a size, position, and direction of a target object in the input 2-D image;

calculating, when a 3-D rough geometric model of the target object in the input 2-D image is projected onto a 2-D plane in the detected size, position, and direction, the position of each vertex of the 3-D rough geometric model on the 2-D plane;

calculating, when the 3-D rough geometric model is projected onto the 2-D plane in a predetermined size, position, and direction, the position of each vertex of the 3-D rough geometric model on the 2-D plane;

generating an approximate image as a texture image, the approximate image being approximate to an image obtained by projecting the target object onto the 2-D plane in the predetermined size, position, and direction, by modifying the input 2-D image based on a correspondence relationship between the calculated position of each vertex of the 3-D rough geometric model in the detected size, position and direction and the calculated position of each vertex of the 3-D rough geometric model in the predetermined size, position and direction; and mapping the texture image to the 3-D rough geometric model in the predetermined size, position and direction so as to generate a 3-D model of the target object.

8. A 3-D model generation method according to claim 7, further comprising the step of setting a pixel value of a region in the vicinity of and/or outside an outline of the target object in the texture image to a pixel value of a region inside the outline of the target object in the texture image.

9. A 3-D model generation method comprising the steps of:

inputting an image of a face;

designating the position of at least one portion in the race in the input image;

detecting an outline feature of a jaw of the face based on the designated position of the at least one portion in the face in the input image, creating an energy image including the outline feature of the jaw from the image energy of a color difference map, and determining a shape of the jaw from the detected outline feature of the jaw; and selecting a 3-D model corresponding to a result of the determination among the plurality of 3-D models, and generating a 3-D model of the face in the input image based on the selected 3-D model.

10. A 3-D model generation method comprising the steps of:

inputting an image of a face;

designating the position of at least one portion in the face in the input image;

detecting an outline feature of a jaw of the face based on the designated position of the at least one portion in the face in the input image, and determining a shape of the jaw from the detected outline feature of the jaw; and selecting a 3-D model corresponding to a result of the determination among the plurality of 3-D models, and generating a 3-D model of the face in the input image based on the selected 3-D model;

wherein, the outline detection/determination step includes the steps of:

calculating the position of a center of the face based on the designated position of the at least one portion in the face in the input image;

setting an initial outline of the face;

calculating a color difference between adjacent pixels on a line passing from the center of the face through a point on the initial outline of the face, and generating a color difference map image including a pixel having a pixel value of the calculated color difference;

extracting an outline of the face by moving the initial outline of the face in accordance with a dynamic outline model by utilizing the color difference map image;

calculating a distance function based on the outline of the face; and determining a shape of a jaw of the face by comparing the calculated distance function with a distance function created in advance based on a reference outline.

11. A computer-readable rewording medium storing a program for instructing a computer to execute a 3-D model generation operation for generating a 3-D model of a target object in a 2-D image, wherein the 3-D model generation operation includes the steps of:

inputting a 2-D image;

detecting a size, position, and direction of a target object in the input 2-D image;

calculating, when a 3-D rough geometric model of the target object in the input 2-D image is projected onto a 2-D plane in the detected size, position, and direction, the position of each vertex of the 3-D rough geometric model on the 2-D plane;

calculating, when the 3-D rough geometric model is projected onto the 2-D plane in a predetermined size, position, and direction, the position of each vertex of the 3-D rough geometric model on the 2-D plane;

generating an approximate image as a texture image, the approximate image being approximate to an image obtained by projecting the target object onto the 2-D plane in the predetermined size, position, and direction, by modifying the input image based on a correspondence relationship between the calculated position of each vertex of the 3-D rough geometric model in the detected size, position and direction and the calculated position of each vertex of the 3-D rough geometric model in the predetermined size, position and direction; and mapping the texture image to the 3-D rough geometric model in the predetermined size, position and direction so as to generate a 3-D model of the target object.

12. A recording medium according to claim 11, wherein the 3-D model generation operation further includes the step of setting a pixel value of a region in the vicinity of and/or outside an outline of the target object in the texture image to a pixel value of a region inside the outline of the target object in the texture image.

13. A computer-readable recording medium storing a program for instructing a computer to execute a 3-D model generation operation for generating A 3-D model of a target object in an image, wherein the 3-D model generation operation includes the steps of:

inputting an image of a face;

designating the position of at least one portion in the face in the input image;

detecting an outline feature of a jaw of the face based on the designated position of the at least one portion in the face in the input image, creating an energy image including the outline feature of the jaw from the image energy of a color difference map, and determining a shape of the jaw from the detected outline feature of the jaw; and selecting a 3-D model corresponding to a result of the determination among the plurality of 3-D models, and generating a 3-D model of the face in the input image basted on the selected 3-D model.

14. A computer readable recording medium storing a program for instructing a computer to execute a 3-D model generation operation for generating a 3-D model of a target object in an image, wherein the 3-D model generation operation includes the steps of:

inputting an image of a face;

designating the position of at least one portion in the face in the input image;

detecting an outline feature of a jaw of the face based on the designated position of the at least one portion in the face in the input image, and determining a shape of the jaw from the detected outline feature of the jaw; and selecting a 3-D model corresponding to a result of the determination among the plurality of 3-D models, and generating a 3-D model of the face in the input image based on the selected 3-D model;

wherein the outline detection/determination step includes the steps of:

calculating the position of a center of the face based on the designated position of the at least one portion in the face in the input image;

setting an initial outline of the face;

calculating a color difference between adjacent pixels on a line passing from the center of the face through a point on the initial outline of the face, and generating a color difference map image including a pixel having a pixel value of the calculated color difference;

extracting an outline of the face by moving the initial outline of the face in accordance with a dynamic outline model by utilizing the color difference map image;

calculating a distance function based on the outline of the face; and determining a shape of a jaw of the face by comparing the calculated distance function with a distance function created in advance based on a reference outline.

* * * * *